(12) United States Patent
Dai et al.

(10) Patent No.: US 10,873,889 B2
(45) Date of Patent: *Dec. 22, 2020

(54) HANDOVER APPARATUS AND METHOD

(71) Applicant: HUAWEI TECHNOLOGIES CO., LTD., Guangdong (CN)

(72) Inventors: Mingzeng Dai, Shanghai (CN); Jing Liu, Shanghai (CN); Yi Guo, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,195

(22) Filed: Jul. 9, 2019

(65) Prior Publication Data
US 2019/0335372 A1 Oct. 31, 2019

Related U.S. Application Data

(63) Continuation of application No. 15/660,457, filed on Jul. 26, 2017, now Pat. No. 10,362,519, which is a
(Continued)

(51) Int. Cl.
*H04W 36/14* (2009.01)
*H04W 36/08* (2009.01)
*H04W 36/34* (2009.01)

(52) U.S. Cl.
CPC ........... *H04W 36/14* (2013.01); *H04W 36/08* (2013.01); *H04W 36/34* (2013.01)

(58) Field of Classification Search
CPC ...... H04W 36/34; H04W 36/14; H04W 36/08
See application file for complete search history.

(56) References Cited

U.S. PATENT DOCUMENTS

2012/0302245 A1   11/2012  Huang
2013/0183970 A1   7/2013   Chen et al.
(Continued)

FOREIGN PATENT DOCUMENTS

CN    102083154 A    6/2011
CN    102238666 A    11/2011
(Continued)

OTHER PUBLICATIONS

3GPP TS 36.300 V12.4.0 (Dec. 2014),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12), Dec. 2014. total 204 pages.
(Continued)

*Primary Examiner* — Julio R Perez
(74) *Attorney, Agent, or Firm* — Gregg L. Jansen

(57) ABSTRACT

A handover apparatus and method, where the handover method includes receiving, by a target primary base station, a handover request from a source primary base station, where the handover request includes first configuration information of a source secondary base station, and the source primary base station and the source secondary base station jointly provide services for user equipment, sending, by the target primary base station, a first indication to the source secondary base station, where the first indication instructs the source secondary base station to remain unchanged, and sending, by the target primary base station, a handover acknowledgement to the source primary base station.

14 Claims, 10 Drawing Sheets

---

A target primary base station receives a handover request sent by a source primary base station, where the handover request includes first configuration information of a source secondary base station, and the source primary base station and the source secondary base station jointly provide services for user equipment — 301

↓

The target primary base station sends a first indication to the source secondary base station, where the first indication is used to instruct the source secondary base station to remain unchanged — 302

↓

The target primary base station sends a handover acknowledgement to the source primary base station, where the handover acknowledgement includes second configuration information of the source secondary base station, and the second configuration information is used by the target primary base station and the source secondary base station to jointly provide services for the user equipment — 303

Related U.S. Application Data continuation of application No. PCT/CN2015/071515, filed on Jan. 26, 2015.

(56) References Cited

U.S. PATENT DOCUMENTS

| | | | |
|---|---|---|---|
| 2013/0259003 A1 | 10/2013 | Kwon et al. | |
| 2015/0110037 A1 | 4/2015 | Wu et al. | |
| 2016/0057660 A1 | 2/2016 | Hong et al. | |
| 2016/0057663 A1* | 2/2016 | Teyeb | H04W 76/15 455/436 |
| 2016/0337924 A1 | 11/2016 | Ohta et al. | |
| 2016/0337925 A1 | 11/2016 | Fujishiro et al. | |
| 2017/0257812 A1* | 9/2017 | Dai | H04W 36/38 |
| 2017/0289879 A1 | 10/2017 | Wang et al. | |
| 2018/0176839 A1 | 6/2018 | Ohara et al. | |

FOREIGN PATENT DOCUMENTS

| | | |
|---|---|---|
| CN | 102421149 A | 4/2012 |
| CN | 103457690 A | 12/2013 |
| CN | 104301955 A | 1/2015 |
| EP | 2605591 A1 | 6/2013 |
| EP | 2978261 A1 | 1/2016 |
| KR | 20140118681 A | 10/2014 |
| WO | 2011020062 A2 | 2/2011 |
| WO | 2012081923 A2 | 6/2012 |
| WO | 2013143613 A1 | 10/2013 |
| WO | 2014148874 A1 | 9/2014 |
| WO | 2014158002 A1 | 10/2014 |
| WO | 2014173359 A1 | 10/2014 |
| WO | 2015114687 A1 | 8/2015 |
| WO | 2015115621 A1 | 8/2015 |
| WO | 2015115629 A1 | 8/2015 |
| WO | 2015141607 A1 | 9/2015 |
| WO | 2015184889 A1 | 12/2015 |

OTHER PUBLICATIONS

3GPP TS 36.423 V12.4.2 (Dec. 2014),3rd Generation Partnership Project;Technical Specification Group Radio Access getwork;Evolved Universal Terrestrial Radio Access Network(E-UTRAN);X2 application protocol (X2AP)(Release 12), Dec. 2014. total 251 pages.

Broadcom Corporation, MCG handover for Dual Connectivity. 3GPP TSG-RAN WG2 Meeting #85 R2-140531, Prague, Czech Republic, Feb. 10-14, 2014, 8 pages.

3GPP TS 36.401 V12.1.0 (Dec. 2014);3rd Generation Partnership Project;Technical Specification Group Radio Access Network;Evolved Universal Terrestrial Radio Access Network (E-UTRAN);Architecture description(Release 12),total 9 pages.

ZTE Corporation,"Discussion on handover procedure for small cell",3GPP TSG-RAN2 Meeting #85 R2-140114, Prague, Czech, Jan. 10-14, 2014,total 6 pages.

3GPP TS 36.331 V11.10.0 (Dec. 2014), 3rd Generation Partnership Project;Technical Specification Group Radio Access Network;Evolved Universal Terrestrial Radio Access (E-UTRA);Radio Resource Control (RRC);Protocol specification (Release 11), Dec. 2014. total 356 pages.

* cited by examiner

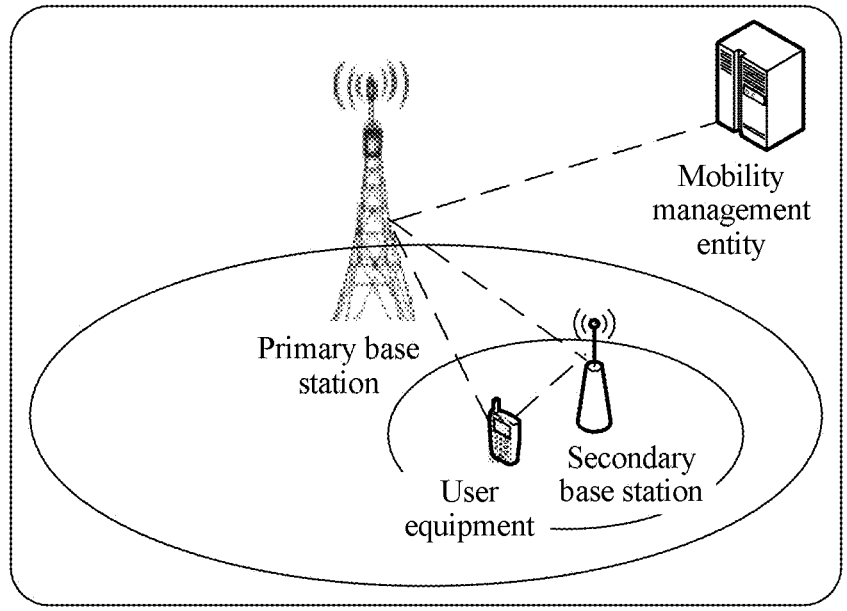

FIG. 2

```
┌─────────────────────────────────────────────────────────┐
│  A target primary base station receives a handover      │
│  request sent by a source primary base station, where   │
│  the handover request includes first configuration      │──∿ 301
│  information of a source secondary base station, and    │
│  the source primary base station and the source         │
│  secondary base station jointly provide services for    │
│  user equipment                                         │
└─────────────────────────────────────────────────────────┘
                            │
                            ▼
┌─────────────────────────────────────────────────────────┐
│  The target primary base station sends a first          │
│  indication to the source secondary base station,       │──∿ 302
│  where the first indication is used to instruct the     │
│  source secondary base station to remain unchanged      │
└─────────────────────────────────────────────────────────┘
                            │
                            ▼
┌─────────────────────────────────────────────────────────┐
│  The target primary base station sends a handover       │
│  acknowledgement to the source primary base station,    │
│  where the handover acknowledgement includes second     │
│  configuration information of the source secondary      │──∿ 303
│  base station, and the second configuration information │
│  is used by the target primary base station and the     │
│  source secondary base station to jointly provide       │
│  services for the user equipment                        │
└─────────────────────────────────────────────────────────┘
```

FIG. 3

HANDOVER APPARATUS AND METHOD

CROSS-REFERENCE TO RELATED APPLICATIONS

This application is a continuation of U.S. patent application Ser. No. 15/660,457, filed on Jul. 26, 2017, which a continuation of International Patent Application No. PCT/CN2015/071575, filed on Jan. 26, 2015. All of the aforementioned patent applications are hereby incorporated by reference in their entireties.

TECHNICAL FIELD

The present disclosure relates to the communications field, and in particular, to a handover apparatus and method.

BACKGROUND

A dual connectivity technology is also referred to as an inter-base station carrier aggregation technology or a multistream aggregation technology, and the dual connectivity technology means that user equipment receives data from at least two base stations, that is, both a primary base station (primary base station or master base station) and a secondary base station provide communications services for the user equipment. In a typical scenario, user equipment receives data from both a macro base station and a small cell, the macro base station, as a primary base station, provides wide coverage to reduce a quantity of handover times, and the small cell, as a secondary base station, shares data to improve a capacity of a hotspot area.

In some scenarios, for example, if user equipment moves out of a coverage area of a primary base station that provides a service for the user equipment, handover from the primary base station to another primary base station needs to be performed. In some other approaches, a secondary base station is released in a process of handover from a primary base station to another primary base station. As a result, a service cannot be further provided to user equipment in a dual connectivity manner, and user experience is affected.

SUMMARY

Embodiments of the present disclosure provide a handover apparatus and method to implement that a source secondary base station remains unchanged in a process of handover of user equipment from a primary base station to another primary base station, reduce a delay in the handover process, and avoid an interruption problem of data communication between the user equipment and the source secondary base station in the handover process.

According to a first aspect, an embodiment of the present disclosure provides a handover method, including receiving, by a target primary base station, a handover request sent by a source primary base station, where the handover request includes first configuration information of a source secondary base station, and the source primary base station and the source secondary base station jointly provide services for user equipment, sending, by the target primary base station, a first indication to the source secondary base station, where the first indication is used to instruct the source secondary base station to remain unchanged, and sending, by the target primary base station, a handover acknowledgement to the source primary base station, where the handover acknowledgement includes second configuration information of the source secondary base station, and the second configuration information is used to jointly provide services for the user equipment by the target primary base station and the source secondary base station.

With reference to the first aspect, in a first implementation manner, the first indication is further used to instruct the source secondary base station to remain as a secondary base station serving the user equipment, and instruct to change a primary base station serving the user equipment from the source primary base station to the target primary base station.

With reference to the first aspect or the first implementation manner of the first aspect, in a second implementation manner of the first aspect, the method further includes sending, by the target primary base station to the source secondary base station, a user equipment identity allocated by the source secondary base station, where the user equipment identity allocated by the source secondary base station is used by the source secondary base station to identify the user equipment, and is sent by the source primary base station to the target primary base station.

With reference to any one of the first aspect, or the first to the second implementation manners of the first aspect, in a third implementation manner of the first aspect, the method further includes receiving, by the target primary base station, transmission path information sent by the source secondary base station or the source primary base station, where the transmission path information is used by the target primary base station to complete switch of transmission paths between the source secondary base station and serving gateways.

With reference to the third implementation manner of the first aspect, in a fourth implementation manner of the first aspect, the method further includes sending, by the target primary base station, a second indication to the source primary base station, where the second indication is used to instruct the source primary base station to keep the source secondary base station as the secondary base station of the user equipment.

With reference to any one of the first aspect, or the first to the fourth implementation manners of the first aspect, in a fifth implementation manner of the first aspect, the method further includes receiving, by the target primary base station, a third indication sent by the source primary base station, where the third indication is used to instruct the target primary base station to keep the source secondary base station as the secondary base station of the user equipment.

With reference to any one of the first aspect, or the first to the fifth implementation manners of the first aspect, in a sixth implementation manner of the first aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the first aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a second aspect, an embodiment of the present disclosure provides a handover method, including sending, by a source primary base station, a handover request to a target primary base station, where the handover request includes first configuration information of a source secondary base station, and the source primary base station and the source secondary base station jointly provide services for user equipment, and receiving, by the source primary base station, a handover acknowledgement sent by the target primary base station, where the handover acknowledgement includes second configuration information of the source secondary base station, and the second configuration information is used to jointly provide services for the user equipment by the target primary base station and the source secondary base station, where the second configuration information of the source secondary base station is based on a first indication sent by the target primary base station to the source secondary base station, and the first indication is used to instruct the source secondary base station to remain unchanged.

With reference to the second aspect, in a first implementation manner, the first indication is further used to instruct the source secondary base station to remain as a secondary base station serving the user equipment, and instruct to change a primary base station serving the user equipment from the source primary base station to the target primary base station.

With reference to the second aspect or the first implementation manner of the second aspect, in a second implementation manner of the second aspect, the method further includes sending, by the source primary base station to the target primary base station, a user equipment identity allocated by the source secondary base station such that the target primary base station sends, to the source secondary base station, the user equipment identity allocated by the source secondary base station, where the user equipment identity allocated by the source secondary base station is used by the source secondary base station to identify the user equipment.

With reference to any one of the second aspect, or the first to the second implementation manners of the second aspect, in a third implementation manner of the second aspect, the method further includes sending, by the source primary base station, transmission path information to the target primary base station, where the transmission path information is used by the target primary base station to complete switch of transmission paths between the source secondary base station and serving gateways.

With reference to any one of the second aspect, or the first to the third implementation manners of the second aspect, in a fourth implementation manner of the second aspect, the method further includes receiving, by the source primary base station, a second indication sent by the target primary base station, where the second indication is used to instruct the source primary base station to keep the source secondary base station as the secondary base station of the user equipment, and keeping, by the source primary base station according to the second indication, the source secondary base station as the secondary base station of the user equipment.

With reference to the second aspect or the first implementation manner of the second aspect, in a fifth implementation manner of the second aspect, the method further includes triggering, by the source primary base station according to the handover acknowledgement, the source secondary base station to release a bearer of the user equipment or a context of the user equipment.

With reference to any one of the second aspect, or the first to the fifth implementation manners of the second aspect, in a sixth implementation manner of the second aspect, the method further includes sending, by the source primary base station, a third indication to the target primary base station, where the third indication is used to instruct the target primary base station to keep the source secondary base station as the secondary base station serving the user equipment.

With reference to any one of the second aspect, or the first to the sixth implementation manners of the second aspect, in a seventh implementation manner of the second aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the second aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a third aspect, an embodiment of the present disclosure provides a handover method, including receiving, by a source secondary base station, a first indication sent by a target primary base station, where the first indication is used to instruct the source secondary base station to remain unchanged, and the first indication is based on a handover request that is sent by a source primary base station and that is received by the target primary base station, where the handover request includes first configuration information of the source secondary base station, and the source primary base station and the source secondary base station jointly provide services for user equipment, and the handover request is used by the target primary base station to send a handover acknowledgement to the source primary base station, where the handover acknowledgement includes second configuration information of the source secondary base station, and the second configuration information is used to jointly provide services for the user equipment by the target primary base station and the source secondary base station.

With reference to the third aspect, in a first implementation manner, the first indication is further used to instruct the source secondary base station to remain as a secondary base station serving the user equipment, and instruct to change a primary base station serving the user equipment from the source primary base station to the target primary base station.

With reference to the third aspect or the first implementation manner of the third aspect, in a second implementation manner of the third aspect, the method further includes receiving, by the source secondary base station, a user equipment identity that is allocated by the source secondary base station and sent by the target primary base station, where the user equipment identity allocated by the source secondary base station is used by the source secondary base station to identify the user equipment, and is sent by the source primary base station to the target primary base station.

With reference to any one of the third aspect, or the first to the second implementation manners of the third aspect, in a third implementation manner of the third aspect, the method further includes sending, by the source secondary base station, transmission path information to the target primary base station, where the transmission path information is used by the target primary base station to complete switch of transmission paths between the source secondary base station and serving gateways.

With reference to any one of the third aspect, or the first to the third implementation manners of the third aspect, in a fourth implementation manner of the third aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the third aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a fourth aspect, an embodiment of the present disclosure provides a handover method, including receiving, by a target primary base station, a handover request sent by a source primary base station, where the handover request includes configuration information of a source secondary base station, and the source primary base station and the source secondary base station jointly provide services for user equipment, sending, by the target primary base station, a first indication to a target secondary base station, where the first indication is used to instruct the target secondary base station to serve as a secondary base station of the user equipment, and sending, by the target primary base station, a handover acknowledgement to the source primary base station, where the handover acknowledgement includes configuration information of the target secondary base station, and the configuration information is used by the target primary base station and the target secondary base station to jointly provide services for the user equipment.

With reference to the fourth aspect, in a first implementation manner, the method further includes receiving, by the target primary base station, first transmission path information sent by the target secondary base station, where the first transmission path information is allocated by the target secondary base station and is used for data transmission between the target secondary base station and a serving gateway, and sending, by the target primary base station, second transmission path information to the target secondary base station, where the second transmission path information is allocated by the serving gateway and is used for data transmission between the target secondary base station and the serving gateway.

With reference to any one of the fourth aspect, or the first to the second implementation manners of the fourth aspect, in a third implementation manner of the fourth aspect, the method further includes sending, by the target primary base station, a second indication to the source primary base station, where the second indication is used to indicate that the target primary base station adds the target secondary base station as the secondary base station of the user equipment.

With reference to any one of the fourth aspect, or the first to the third implementation manners of the fourth aspect, in a fourth implementation manner of the fourth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the fourth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a fifth aspect, an embodiment of the present disclosure provides a handover method, including sending, by a source primary base station, a handover request to a target primary base station, where the handover request includes configuration information of a source secondary base station, and the source primary base station and the source secondary base station jointly provide services for user equipment, and receiving, by the source primary base station, a handover acknowledgement sent by the target primary base station, where the handover acknowledgement includes configuration information of a target secondary base station, and the configuration information is used by the target primary base station and the target secondary base station to jointly provide services for the user equipment, where the handover acknowledgement is based on a first indication sent by the target primary base station to the target secondary base station, and the first indication is used to instruct the target secondary base station to serve as a secondary base station of the user equipment.

With reference to the fifth aspect, in a first implementation manner, the method further includes receiving, by the source primary base station, a second indication sent by the target primary base station, where the second indication is used to indicate that the target primary base station adds the target secondary base station as the secondary base station of the user equipment.

With reference to the first implementation manner of the fifth aspect, in a second implementation manner of the fifth aspect, the method further includes releasing, by the source primary base station, a bearer of the user equipment or a context of the user equipment according to the second indication.

With reference to any one of the fifth aspect, or the first to the second implementation manners of the fifth aspect, in a third implementation manner of the fifth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the fifth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a sixth aspect, an embodiment of the present disclosure provides a handover method, including receiving, by a target secondary base station, a first indication sent by a target primary base station, where the first indication is used to instruct the target secondary base station to serve as a secondary base station of user equipment, and the first indication is based on a handover request that is sent by a source primary base station and that is received by the target primary base station, where the handover request includes configuration information of a source secondary base station, and the source primary base station and the source secondary base station provide services for the user equipment together, and the handover request is used by the target primary base station to send a handover acknowledgement to the source primary base station, where the handover acknowledgement includes configuration information of the target secondary base station, and the configuration information is used by the target primary base station and the target secondary base station to jointly provide services for the user equipment.

With reference to the sixth aspect, in a first implementation manner, the method further includes sending, by the target secondary base station, first transmission path information to the target primary base station, where the first transmission path information is allocated by the target secondary base station and is used for data transmission between the target secondary base station and a serving gateway, and receiving, by the target secondary base station, second transmission path information sent by the target primary base station, where the second transmission path information is allocated by the serving gateway and is used for data transmission between the target secondary base station and the serving gateway.

With reference to the sixth aspect or the first implementation manner of the sixth aspect, in a second implementation manner of the sixth aspect, the first indication is used by the target primary base station to send a second indication to the source secondary base station, and the second indication is used to indicate that the target primary base station adds the target secondary base station as the secondary base station of the user equipment.

With reference to any one of the sixth aspect, or the first to the second implementation manners of the sixth aspect, in a third implementation manner of the sixth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the sixth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a seventh aspect, an embodiment of the present disclosure provides a handover apparatus, and a target primary base station uses the apparatus to perform handover from a base station to another base station. The apparatus includes a transceiver configured to receive a handover request sent by a source primary base station, where the handover request includes first configuration information of a source secondary base station, and the source primary base station and the source secondary base station jointly provide services for user equipment, and a processor configured to trigger the transceiver to send a first indication to the source secondary base station, where the first indication is used to instruct the source secondary base station to remain unchanged, and trigger the transceiver to send a handover acknowledgement to the source primary base station, where the handover acknowledgement includes second configuration information of the source secondary base station, and the second configuration information is used to jointly provide services for the user equipment by the target primary base station and the source secondary base station, where the transceiver is further configured to send the first indication to the source secondary base station, and send the handover acknowledgement to the source primary base station.

With reference to the seventh aspect, in a first implementation manner, the first indication is further used to instruct the source secondary base station to remain as a secondary base station serving the user equipment, and instruct to change a primary base station serving the user equipment from the source primary base station to the target primary base station.

With reference to the seventh aspect or the first implementation manner of the seventh aspect, in a second implementation manner of the seventh aspect, the transceiver is further configured to receive a user equipment identity that is allocated by the source secondary base station and sent by the source primary base station, and send, to the source secondary base station, the user equipment identity allocated by the source secondary base station, where the user equipment identity allocated by the source secondary base station is used by the source secondary base station to identify the user equipment.

With reference to any one of the seventh aspect, or the first to the second implementation manners of the seventh aspect, in a third implementation manner of the seventh aspect, the transceiver is further configured to receive transmission path information sent by the source secondary base station or the source primary base station, where the transmission path information is used by the target primary base station to complete switch of transmission paths between the source secondary base station and serving gateways.

With reference to the third implementation manner of the seventh aspect, in a fourth implementation manner of the seventh aspect, the processor is further configured to trigger the transceiver to send a second indication to the source primary base station, where the second indication is used to instruct the source primary base station to keep the source secondary base station as the secondary base station of the user equipment, and the transceiver is further configured to send the second indication to the source primary base station.

With reference to any one of the seventh aspect, or the first to the fourth implementation manners of the seventh aspect, in a fifth implementation manner of the seventh aspect, the transceiver is further configured to receive a third indication sent by the source primary base station, where the third indication is used to instruct the target primary base station to keep the source secondary base station as the secondary base station of the user equipment.

With reference to any one of the seventh aspect, or the first to the fifth implementation manners of the seventh aspect, in a sixth implementation manner of the seventh aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the seventh aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to an eighth aspect, an embodiment of the present disclosure provides a handover apparatus, and a source primary base station uses the apparatus to perform handover from a base station to another base station. The apparatus includes a processor configured to trigger a transceiver to send a handover request to a target primary base station, where the handover request includes first configuration information of a source secondary base station, and the source primary base station and the source secondary base station jointly provide services for user equipment, and the transceiver configured to send the handover request to the target primary base station, and receive a handover acknowledgement sent by the target primary base station, where the handover acknowledgement includes second configuration information of the source secondary base station, and the second configuration information is used to jointly provide services for the user equipment by the target primary base station and the source secondary base station, where the second configuration information of the source secondary base station is based on a first indication sent by the target primary base station to the source secondary base station, and the first indication is used to instruct the source secondary base station to remain unchanged.

With reference to the eighth aspect, in a first implementation manner, the first indication is further used to instruct the source secondary base station to remain as a secondary base station serving the user equipment, and instruct to change a primary base station serving the user equipment from the source primary base station to the target primary base station.

With reference to the eighth aspect or the first implementation manner of the eighth aspect, in a second implementation manner of the eighth aspect, the processor is further configured to trigger the transceiver to send, to the target primary base station, a user equipment identity allocated by the source secondary base station such that the target primary base station sends, to the source secondary base station, the user equipment identity allocated by the source secondary base station, where the user equipment identity allocated by the source secondary base station is used by the source secondary base station to identify the user equipment, and the transceiver is further configured to send, to the target primary base station, the user equipment identity allocated by the source secondary base station.

With reference to any one of the eighth aspect, or the first to the second implementation manners of the eighth aspect, in a third implementation manner of the eighth aspect, the processor is further configured to trigger the transceiver to send transmission path information to the target primary base station, where the transmission path information is used by the target primary base station to complete switch of transmission paths between the source secondary base station and serving gateways, and the transceiver is further configured to send the transmission path information to the target primary base station.

With reference to any one of the eighth aspect, or the first to the third implementation manners of the eighth aspect, in a fourth implementation manner of the eighth aspect, the transceiver is further configured to receive a second indication sent by the target primary base station, where the second indication is used to instruct the source primary base station to keep the source secondary base station as the secondary base station of the user equipment, and the processor is further configured to keep, according to the second indication received by the transceiver, the source secondary base station as the secondary base station of the user equipment.

With reference to the eighth aspect or the first implementation manner of the eighth aspect, in a fifth implementation manner of the eighth aspect, the source secondary base station is triggered according to the handover acknowledgement received by the transceiver, to release a bearer of the user equipment or a context of the user equipment.

With reference to any one of the eighth aspect, or the first to the fifth implementation manners of the eighth aspect, in a sixth implementation manner of the eighth aspect, the processor is further configured to trigger the transceiver to send a third indication to the target primary base station, where the third indication is used to instruct the target primary base station to keep the source secondary base station as the secondary base station of the user equipment, and the transceiver is further configured to send the third indication to the target primary base station.

With reference to any one of the eighth aspect, or the first to the sixth implementation manners of the eighth aspect, in a seventh implementation manner of the eighth aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the eighth aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a ninth aspect, an embodiment of the present disclosure provides a handover apparatus, and a source secondary base station uses the apparatus to perform handover from a base station to another base station. The apparatus includes a transceiver configured to receive a first indication sent by a target primary base station, where the first indication is used to instruct the source secondary base station to remain unchanged, and the first indication is based on a handover request that is sent by a source primary base station and that is received by the target primary base station, where the handover request includes first configuration information of the source secondary base station, and the source primary base station and the source secondary base station jointly provide services for user equipment, and the handover request is used by the target primary base station to send a handover acknowledgement to the source primary base station, where the handover acknowledgement includes second configuration information of the source secondary base station, and the second configuration information is used to jointly provide services for the user equipment by the target primary base station and the source secondary base station.

With reference to the ninth aspect, in a first implementation manner, the first indication is further used to instruct the source secondary base station to remain as a secondary base station serving the user equipment, and instruct to change a primary base station serving the user equipment from the source primary base station to the target primary base station.

With reference to the ninth aspect or the first implementation manner of the ninth aspect, in a second implementation manner of the ninth aspect, the transceiver is further configured to receive a user equipment identity that is allocated by the source secondary base station and sent by the target primary base station, where the user equipment identity allocated by the source secondary base station is used by the source secondary base station to identify the user equipment, and is sent by the source primary base station to the target primary base station.

With reference to any one of the ninth aspect, or the first to the second implementation manners of the ninth aspect, in a third implementation manner of the ninth aspect, the apparatus further includes a processor configured to trigger the transceiver to send transmission path information to the target primary base station, where the transmission path information is used by the target primary base station to complete switch of transmission paths between the source secondary base station and serving gateways, and the transceiver is further configured to send the transmission path information to the target primary base station.

With reference to any one of the ninth aspect, or the first to the third implementation manners of the ninth aspect, in a fourth implementation manner of the ninth aspect, the first configuration information includes at least one of a cell identity, allocated by the source primary base station, of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the ninth aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a tenth aspect, an embodiment of the present disclosure provides a handover apparatus, and a target primary base station uses the apparatus to perform handover from a base station to another base station. The apparatus includes a transceiver configured to receive a handover request sent by a source primary base station, where the handover request includes configuration information of a source secondary base station, and the source primary base station and the source secondary base station jointly provide services for user equipment, and a processor configured to trigger the transceiver to send a first indication to a target secondary base station, where the first indication is used to instruct the target secondary base station to serve as a secondary base station of the user equipment, and trigger the transceiver to send a handover acknowledgement to the source primary base station, where the handover acknowledgement includes configuration information of the target secondary base station, and the configuration information is used by the target primary base station and the target secondary base station to jointly provide services for the user equipment, where the transceiver is further configured to send the first indication to the target secondary base station, and send the handover acknowledgement to the source primary base station.

With reference to the tenth aspect, in a first implementation manner, the transceiver is further configured to receive first transmission path information sent by the target secondary base station, where the first transmission path information is allocated by the target secondary base station and is used for data transmission between the target secondary base station and a serving gateway. The processor is further configured to trigger the transceiver to send second transmission path information to the target secondary base station, where the second transmission path information is allocated by the serving gateway and is used for data transmission between the target secondary base station and the serving gateway, and the transceiver is further configured to send the second transmission path information to the target secondary base station.

With reference to any one of the tenth aspect, or the first to the second implementation manners of the tenth aspect, in a third implementation manner of the tenth aspect, the processor is further configured to trigger the transceiver to send a second indication to the source primary base station, where the second indication is used to indicate that the target primary base station adds the target secondary base station as the secondary base station of the user equipment, and the transceiver is further configured to send the second indication to the source primary base station.

With reference to any one of the tenth aspect, or the first to the third implementation manners of the tenth aspect, in a fourth implementation manner of the tenth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the tenth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to an eleventh aspect, an embodiment of the present disclosure provides a handover apparatus, and a source primary base station uses the apparatus to perform handover from a base station to another base station. The apparatus includes a processor configured to trigger a transceiver to send a handover request to a target primary base station, where the handover request includes configuration information of a source secondary base station, and the source primary base station and the source secondary base station jointly provide services for user equipment, and the transceiver configured to send the handover request to the target primary base station, and receive a handover acknowledgement sent by the target primary base station, where the handover acknowledgement includes configuration information of a target secondary base station, and the configuration information is used by the target primary base station and the target secondary base station to jointly provide services for the user equipment, where the handover acknowledgement is based on a first indication sent by the target primary base station to the target secondary base station, and the first indication is used to instruct the target secondary base station to serve as a secondary base station of the user equipment.

With reference to the eleventh aspect, in a first implementation manner, the transceiver is further configured to receive a second indication sent by the target primary base station, where the second indication is used to indicate that the target primary base station adds the target secondary base station as the secondary base station of the user equipment.

With reference to the first implementation manner of the eleventh aspect, in a second implementation manner of the eleventh aspect, the processor is further configured to release a bearer of the user equipment or a context of the user equipment according to the second indication received by the transceiver.

With reference to any one of the eleventh aspect, or the first to the second implementation manners of the eleventh aspect, in a third implementation manner of the eleventh aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the eleventh aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a twelfth aspect, an embodiment of the present disclosure provides a handover apparatus, and a target secondary base station uses the apparatus to perform handover from a base station to another base station. The apparatus includes a transceiver configured to receive a first indication sent by a target primary base station, where the first indication is used to instruct the target secondary base station to serve as a secondary base station of user equipment, and the first indication is based on a handover request that is sent by a source primary base station and that is received by the target primary base station, where the handover request includes configuration information of a source secondary base station, and the source primary base station and the source secondary base station provide services for the user equipment together, and the handover request is used by the target primary base station to send a handover acknowledgement to the source primary base station, where the handover acknowledgement includes configuration information of the target secondary base station, and the configuration information is used by the target primary base station and the target secondary base station to jointly provide services for the user equipment.

With reference to the twelfth aspect, in a first implementation manner, the apparatus further includes a processor configured to trigger the transceiver to send first transmission path information to the target primary base station, where the first transmission path information is allocated by the target secondary base station and is used for data transmission between the target secondary base station and a serving gateway, and the transceiver is further configured to send the first transmission path information to the target primary base station, and receive second transmission path information sent by the target primary base station, where the second transmission path information is allocated by the serving gateway and is used for data transmission between the target secondary base station and the serving gateway.

With reference to the twelfth aspect or the first implementation manner of the twelfth aspect, in a second implementation manner of the twelfth aspect, the first indication is used by the target primary base station to send a second indication to the source secondary base station, and the second indication is used to indicate that the target primary base station adds the target secondary base station as the secondary base station of the user equipment.

With reference to any one of the twelfth aspect, or the first to the second implementation manners of the twelfth aspect, in a third implementation manner of the twelfth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the twelfth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a thirteenth aspect, an embodiment of the present disclosure provides a handover apparatus, and a target primary base station uses the apparatus to perform handover from a base station to another base station. The apparatus includes a receiving unit configured to receive a handover request sent by a source primary base station, where the handover request includes first configuration information of a source secondary base station, and the source primary base station and the source secondary base station jointly provide services for user equipment, and a sending unit configured to send a first indication to the source secondary base station, where the first indication is used to instruct the source secondary base station to remain unchanged, and send a handover acknowledgement to the source primary base station, where the handover acknowledgement includes second configuration information of the source secondary base station, and the second configuration information is used to jointly provide services for the user equipment by the target primary base station and the source secondary base station.

With reference to the thirteenth aspect, in a first implementation manner, the first indication is further used to instruct the source secondary base station to remain as a secondary base station serving the user equipment, and instruct to change a primary base station serving the user equipment from the source primary base station to the target primary base station.

With reference to the thirteenth aspect or the first implementation manner of the seventh aspect, in a second implementation manner of the thirteenth aspect, the sending unit is further configured to send, to the source secondary base station, a user equipment identity allocated by the source secondary base station, where the user equipment identity allocated by the source secondary base station is used by the source secondary base station to identify the user equipment, and is sent by the source primary base station to the target primary base station.

With reference to any one of the thirteenth aspect, or the first to the second implementation manners of the thirteenth aspect, in a third implementation manner of the thirteenth aspect, the receiving unit is further configured to receive transmission path information sent by the source secondary base station or the source primary base station, where the transmission path information is used by the target primary base station to complete switch of transmission paths between the source secondary base station and serving gateways.

With reference to the third implementation manner of the thirteenth aspect, in a fourth implementation manner of the thirteenth aspect, the sending unit is further configured to send a second indication to the source primary base station, where the second indication is used to instruct the source primary base station to keep the source secondary base station as the secondary base station of the user equipment.

With reference to any one of the thirteenth aspect, or the first to the fourth implementation manners of the thirteenth aspect, in a fifth implementation manner of the thirteenth aspect, the receiving unit is further configured to receive a third indication sent by the source primary base station, where the third indication is used to instruct the target primary base station to keep the source secondary base station as the secondary base station of the user equipment.

With reference to any one of the thirteenth aspect, or the first to the fifth implementation manners of the thirteenth aspect, in a sixth implementation manner of the thirteenth aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the thirteenth aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a fourteenth aspect, an embodiment of the present disclosure provides a handover apparatus, and a source primary base station uses the apparatus to perform handover from a base station to another base station. The apparatus includes a sending unit configured to send a handover request to a target primary base station, where the handover request includes first configuration information of a source secondary base station, and the source primary base station and the source secondary base station jointly provide services for user equipment, and a receiving unit configured to receive a handover acknowledgement sent by the target primary base station, where the handover acknowledgement includes second configuration information of the source secondary base station, and the second configuration information is used to jointly provide services for the user equipment by the target primary base station and the source secondary base station, where the second configuration information of the source secondary base station is based on a first indication sent by the target primary base station to the source secondary base station, and the first indication is used to instruct the source secondary base station to remain unchanged.

With reference to the fourteenth aspect, in a first implementation manner, the first indication is further used to instruct the source secondary base station to remain as a secondary base station serving the user equipment, and instruct to change a primary base station serving the user equipment from the source primary base station to the target primary base station.

With reference to the fourteenth aspect or the first implementation manner of the fourteenth aspect, in a second implementation manner of the fourteenth aspect, the sending unit is further configured to send, to the target primary base station, a user equipment identity allocated by the source secondary base station such that the target primary base station sends, to the source secondary base station, the user equipment identity allocated by the source secondary base station, where the user equipment identity allocated by the source secondary base station is used by the source secondary base station to identify the user equipment.

With reference to any one of the fourteenth aspect, or the first to the second implementation manners of the fourteenth aspect, in a third implementation manner of the fourteenth aspect, the sending unit is further configured to send transmission path information to the target primary base station, where the transmission path information is used by the target primary base station to complete switch of transmission paths between the source secondary base station and serving gateways.

With reference to any one of the fourteenth aspect, or the first to the third implementation manners of the fourteenth aspect, in a fourth implementation manner of the fourteenth aspect, the receiving unit is further configured to receive a second indication sent by the target primary base station, where the second indication is used to instruct the source primary base station to keep the source secondary base station as the secondary base station of the user equipment, and the apparatus further includes a processing unit configured to keep the source secondary base station as the secondary base station of the user equipment according to the second indication received by the receiving unit.

With reference to the fourteenth aspect or the first implementation manner of the fourteenth aspect, in a fifth implementation manner of the fourteenth aspect, the apparatus further includes a processing unit configured to trigger, according to the handover acknowledgement received by the receiving unit, the source secondary base station to release a bearer of the user equipment or a context of the user equipment.

With reference to any one of the fourteenth aspect, or the first to the fifth implementation manners of the fourteenth aspect, in a sixth implementation manner of the fourteenth aspect, the sending unit is further configured to send a third indication to the target primary base station, where the third indication is used to instruct the target primary base station to keep the source secondary base station as the secondary base station serving the user equipment.

With reference to any one of the fourteenth aspect, or the first to the sixth implementation manners of the fourteenth aspect, in a seventh implementation manner of the fourteenth aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the fourteenth aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a fifteenth aspect, an embodiment of the present disclosure provides a handover apparatus, and a source secondary base station uses the apparatus to perform handover from a base station to another base station. The apparatus includes a receiving unit configured to receive a first indication sent by a target primary base station, where the first indication is used to instruct the source secondary base station to remain unchanged, and the first indication is based on a handover request that is sent by a source primary base station and that is received by the target primary base station, where the handover request includes first configuration information of the source secondary base station, and the source primary base station and the source secondary base station jointly provide services for user equipment, and the handover request is used by the target primary base station to send a handover acknowledgement to the source primary base station, where the handover acknowledgement includes second configuration information of the source secondary base station, and the second configuration information is used to jointly provide services for the user equipment by the target primary base station and the source secondary base station.

With reference to the fifteenth aspect, in a first implementation manner, the first indication is further used to instruct the source secondary base station to remain as a secondary base station serving the user equipment, and instruct to change a primary base station serving the user equipment from the source primary base station to the target primary base station.

With reference to the fifteenth aspect or the first implementation manner of the fifteenth aspect, in a second implementation manner of the fifteenth aspect, the receiving unit is further configured to receive a user equipment identity that is allocated by the source secondary base station and sent by the target primary base station, where the user equipment identity allocated by the source secondary base station is used by the source secondary base station to identify the user equipment, and is sent by the source primary base station to the target primary base station.

With reference to any one of the fifteenth aspect, or the first to the second implementation manners of the fifteenth aspect, in a third implementation manner of the fifteenth aspect, the apparatus further includes a sending unit configured to send transmission path information to the target primary base station, where the transmission path information is used by the target primary base station to complete switch of transmission paths between the source secondary base station and serving gateways.

With reference to any one of the fifteenth aspect, or the first to the third implementation manners of the fifteenth aspect, in a fourth implementation manner of the fifteenth aspect, the first configuration information includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the second configuration information includes at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

According to the fifteenth aspect, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

According to a sixteenth aspect, an embodiment of the present disclosure provides a handover apparatus, and a target primary base station uses the apparatus to perform handover from a base station to another base station. The apparatus includes a receiving unit configured to receive a handover request sent by a source primary base station, where the handover request includes configuration information of a source secondary base station, and the source primary base station and the source secondary base station jointly provide services for user equipment, and a sending unit configured to send a first indication to a target secondary base station, where the first indication is used to instruct the target secondary base station to serve as a secondary base station of the user equipment, and send a handover acknowledgement to the source primary base station, where the handover acknowledgement includes configuration information of the target secondary base station, and the configuration information is used by the target primary base station and the target secondary base station to jointly provide services for the user equipment.

With reference to the sixteenth aspect, in a first implementation manner, the receiving unit is further configured to receive first transmission path information sent by the target secondary base station, where the first transmission path information is allocated by the target secondary base station and is used for data transmission between the target secondary base station and a serving gateway, and the sending unit is further configured to send second transmission path information to the target secondary base station, where the second transmission path information is allocated by the serving gateway and is used for data transmission between the target secondary base station and the serving gateway.

With reference to any one of the sixteenth aspect, or the first to the second implementation manners of the sixteenth aspect, in a third implementation manner of the sixteenth aspect, the sending unit is further configured to send a second indication to the source primary base station, where the second indication is used to indicate that the target primary base station adds the target secondary base station as the secondary base station of the user equipment.

With reference to any one of the sixteenth aspect, or the first to the third implementation manners of the sixteenth aspect, in a fourth implementation manner of the sixteenth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the sixteenth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to a seventeenth aspect, an embodiment of the present disclosure provides a handover apparatus, and a source primary base station uses the apparatus to perform handover from a base station to another base station. The apparatus includes a sending unit configured to send a handover request to a target primary base station, where the handover request includes configuration information of a source secondary base station, and the source primary base station and the source secondary base station jointly provide services for user equipment, and a receiving unit configured to receive a handover acknowledgement sent by the target primary base station, where the handover acknowledgement includes configuration information of a target secondary base station, and the configuration information is used by the target primary base station and the target secondary base station to jointly provide services for the user equipment, where the handover acknowledgement is based on a first indication sent by the target primary base station to the target secondary base station, and the first indication is used to instruct the target secondary base station to serve as a secondary base station of the user equipment.

With reference to the seventeenth aspect, in a first implementation manner, the receiving unit is further configured to receive a second indication sent by the target primary base station, where the second indication is used to indicate that the target primary base station adds the target secondary base station as the secondary base station of the user equipment.

With reference to the first implementation manner of the seventeenth aspect, in a second implementation manner of the seventeenth aspect, the apparatus further includes a processing unit configured to release a bearer of the user equipment or a context of the user equipment according to the second indication received by the receiving unit.

With reference to any one of the seventeenth aspect, or the first to the second implementation manners of the seventeenth aspect, in a third implementation manner of the seventeenth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the seventeenth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

According to an eighteenth aspect, an embodiment of the present disclosure provides a handover apparatus, and a target secondary base station uses the apparatus to perform handover from a base station to another base station. The apparatus includes a receiving unit configured to receive a first indication sent by a target primary base station, where the first indication is used to instruct the target secondary base station to serve as a secondary base station of user equipment, and the first indication is based on a handover request that is sent by a source primary base station and that is received by the target primary base station, where the handover request includes configuration information of a source secondary base station, and the source primary base station and the source secondary base station provide services for the user equipment together, and the handover request is used by the target primary base station to send a handover acknowledgement to the source primary base station, where the handover acknowledgement includes configuration information of the target secondary base station, and the configuration information is used by the target primary base station and the target secondary base station to jointly provide services for the user equipment.

With reference to the eighteenth aspect, in a first implementation manner, the apparatus further includes a sending unit configured to send first transmission path information to the target primary base station, where the first transmission path information is allocated by the target secondary base station and is used for data transmission between the target secondary base station and a serving gateway, and the receiving unit is further configured to receive second transmission path information sent by the target primary base station, where the second transmission path information is allocated by the serving gateway and is used for data transmission between the target secondary base station and the serving gateway.

With reference to the eighteenth aspect or the first implementation manner of the eighteenth aspect, in a second implementation manner of the eighteenth aspect, the first indication is used by the target primary base station to send a second indication to the source secondary base station, and the second indication is used to indicate that the target primary base station adds the target secondary base station as the secondary base station of the user equipment.

With reference to any one of the eighteenth aspect, or the first to the second implementation manners of the eighteenth aspect, in a third implementation manner of the eighteenth aspect, the configuration information of the source secondary base station includes at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station, and the configuration information of the target secondary base station includes at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

According to the eighteenth aspect, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

BRIEF DESCRIPTION OF DRAWINGS

FIG. 2 is a schematic diagram of a network architecture in which a primary base station and a secondary base station provide communications services for user equipment;

FIG. 3 is a schematic flowchart of a handover method according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions of the present disclosure may be applied to various communications systems in a wireless cellular network, such as a Global System for Mobile Communications (GSM), a Code Division Multiple Access (CDMA) system, a Wideband CDMA (WCDMA) system, a general packet radio service (GPRS) system, a Long Term Evolution (LTE) system, and a Universal Mobile Telecommunications System (UMTS), which is not limited in the present disclosure.

In the embodiments of the present disclosure, user equipment, also referred to as a mobile terminal, mobile user equipment, or the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network, which is not limited in the present disclosure.

A base station may be a base transceiver station (BTS) in GSM or CDMA, or may be a Node B in WCDMA, or may be an evolved Node B (eNB or e-Node B) in LTE, which is not limited in the present disclosure. The base station also includes control nodes of various access network nodes, such as a radio network controller (RNC) in UMTS, or a controller that manages multiple small cells.

Figure 1:
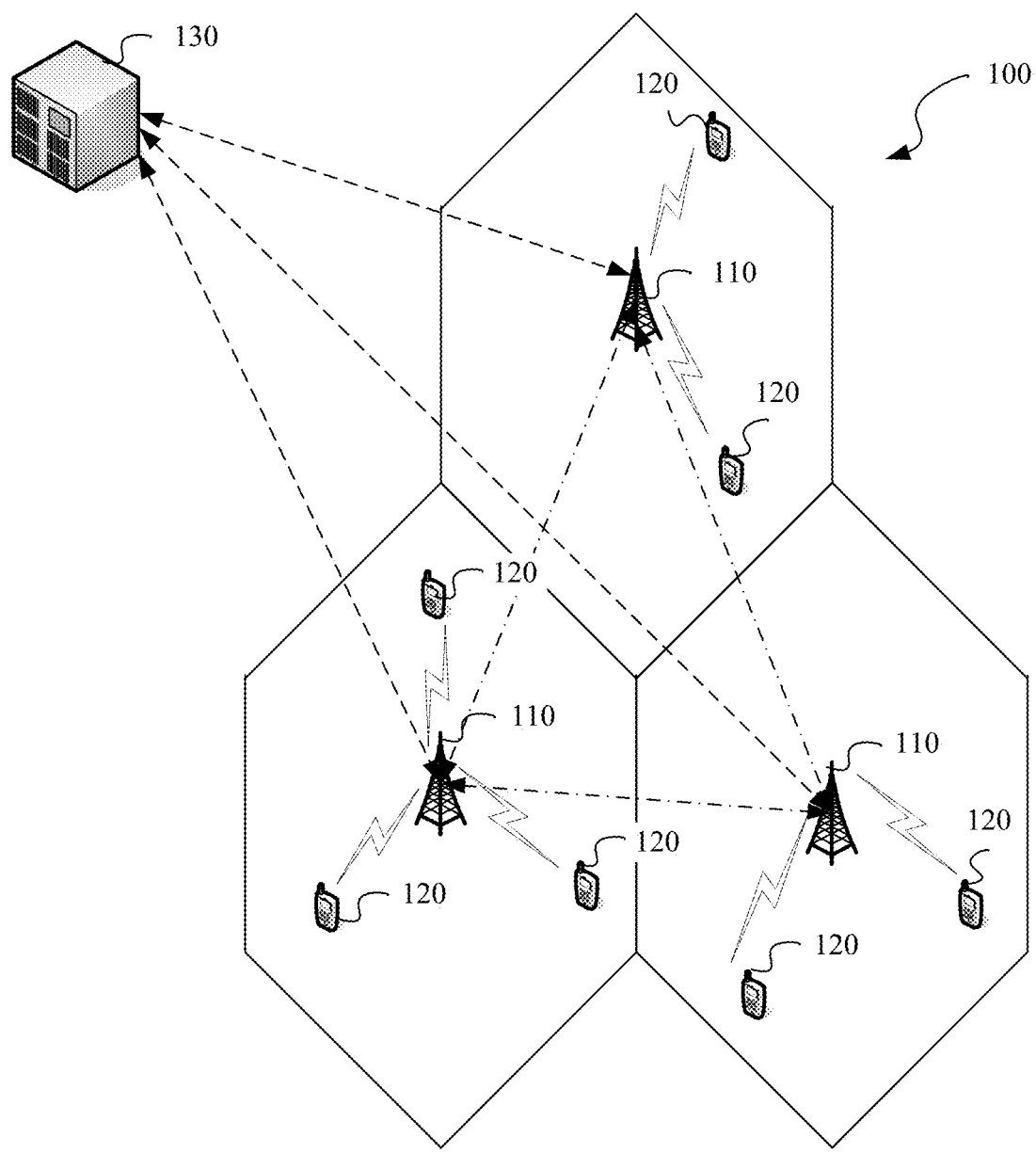
FIG. 1 is a schematic diagram of an architecture of a communications system.

In the embodiments of the present disclosure, an LTE communications system is used as an example, but it is not limited to this. As shown in FIG. 1, in a schematic diagram of an architecture of the LTE communications system, a wireless communications network 100 may include at least one base station 110 and a core network device 130 to support user equipment 120 for communication. For example, the base station 110 may be an eNB in LTE, and the base station 110 may support or manage one or more cells. When the user equipment 120 in a dual connectivity mode needs to communicate with the network, the user equipment 120 may receive data from at least two base stations 110, that is, the at least two base stations 110 provide services for the user equipment 120. The base stations 110 may implement functions of a primary base station and/or a secondary base station. The core network device 130 may include a mobility management entity (MME).

As shown in FIG. 2, FIG. 2 is a schematic diagram of a network architecture in which both a primary base station (for example, a macro base station) and a secondary base station (for example, a macro base station) provide communications services for user equipment. For the user equipment configured with dual connectivity, the primary base station may configure at least one serving cell that includes a primary cell (PCell). The cells may be referred to as a master cell group (MCG), and the PCell may be used by the primary base station to provide non-access stratum information (for example, a tracking area identity), a security parameter, and the like. For example, the MCG may include one PCell, and may further include at least one secondary cell. The secondary base station may configure at least one serving cell that includes a primary secondary cell, the primary secondary cell may be used by the secondary base station to provide a physical layer uplink control channel, random access, or the like, and the cells may be referred to as a secondary cell group. For example, the secondary cell group may include one primary secondary cell, and may further include at least one secondary cell.

In the embodiments of the present disclosure, an involved scenario is handover from a primary base station to another primary base station that provides a service for user equipment. Before the handover, a primary base station that provides a service for the user equipment is referred to as a source primary base station in the following, and after the handover, a primary base station that provides a service for the user equipment is referred to as a target primary base station in the following. Likewise, before the handover, a secondary base station that provides a service for the user equipment is referred to as a source secondary base station in the following, and after the handover, a secondary base station that provides a service for the user equipment is referred to as a target secondary base station in the following.

Embodiment 1

As shown in FIG. 3, an embodiment of the present disclosure provides a handover method, and the method is executed by a target primary base station and includes the following steps.

Step 301: A target primary base station receives a handover request sent by a source primary base station, where the handover request includes first configuration information of a source secondary base station, and the source primary base station and the source secondary base station jointly provide services for user equipment.

Step 302: The target primary base station sends a first indication to the source secondary base station, where the first indication is used to instruct the source secondary base station to remain unchanged.

Step 303: The target primary base station sends a handover acknowledgement to the source primary base station, where the handover acknowledgement includes second configuration information of the source secondary base station, and the second configuration information is used by the target primary base station and the source secondary base station to jointly provide services for the user equipment.

In this embodiment, the first configuration information may be configuration information of a secondary cell group. For example, the first configuration information may include at least one of a cell identity of the secondary cell group of the source secondary base station, cell measurement information of the secondary cell group of the source secondary base station, bearer configuration information of the secondary cell group of the source secondary base station, or a configuration of a primary secondary cell of the source secondary base station. The cell measurement information may be a measurement result of reference signal received power (RSRP), and the bearer configuration information may be a bearer type (for example, a secondary cell group bearer, or a split bearer), or a quality of service (QoS) parameter of a bearer. The secondary cell group bearer may indicate that all data on the bearer is established at the source secondary base station, and the data is directly transmitted between the source secondary base station and a serving gateway (SGW). The split bearer indicates that data on the bearer may be established on both the source primary base station and the source secondary base station, and the data is transmitted between the source primary base station and a serving gateway. For example, the target primary base station may add or delete a serving cell in a secondary cell group according to measurement information of the serving cell in the secondary cell group, or add another cell of the source secondary base station, that is, a cell that is not included in the secondary cell group, as a serving cell. The target primary base station may determine, according to the first configuration information and/or local configuration information of the target primary base station, whether to keep an original secondary cell group. For example, the local configuration information of the target primary base station may be at least one of the following: whether the target primary base station supports a dual connectivity feature, whether the target primary base station supports a function of keeping the source secondary base station unchanged, or a load status of the target primary base station.

In this embodiment, the first indication may be further used to instruct the source secondary base station to remain as a secondary base station serving the user equipment, and instruct to change a primary base station serving the user equipment from the source primary base station to the target primary base station.

For example, when determining to keep the source secondary base station as the secondary base station of the user equipment before and after handover, the target primary base station may send a secondary base station addition request or a secondary base station modification request to the source secondary base station. The secondary base station addition request and the secondary base station modification request are respectively corresponding to a scenario in which a secondary base station is added and a scenario in which a secondary base station is modified and details are described in the following.

The secondary base station addition request is used as an example in the following. The secondary base station addition request includes the first indication, and the first indication is used to instruct to change the source primary base station but keep the source secondary base station unchanged. The first indication may also instruct the source secondary base station to remain unchanged in a handover procedure or based on a handover procedure. The first indication may be a new information element (IE), or may be any other implicit or explicit indication. After the source secondary base station receives the first indication, a source secondary base station addition failure is not determined even when repeated user equipment context information, a repeated bearer, or repeated user equipment subscription information is detected. For example, if the source secondary base station has obtained context information of the user equipment from the source primary base station before handover, for example, transmission path information (for example, an Internet protocol (IP) address and a tunneling protocol (for example, a GPRS Tunneling Protocol (GTP) identity) allocated by a serving gateway for a bearer between the serving gateway and the source primary base station, but the same transmission path information allocated by the serving gateway for the bearer is repeatedly received in the secondary base station addition request message. If the secondary base station addition request message does not include the first indication, the source secondary base station returns a secondary base station addition failure message to the target primary base station. If the secondary base station addition request message includes the first indication, the source secondary base station considers that repetition is allowed, and returns a secondary base station addition acknowledge message to the target primary base station.

In this embodiment of the present disclosure, the target primary base station may receive a third indication sent by the source primary base station, where the third indication is used to instruct the target primary base station to keep the source secondary base station as the secondary base station of the user equipment.

Therefore, in this embodiment, it may be implemented that a secondary base station remains unchanged in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the target primary base station may obtain the second configuration information according to the first configuration information. For example, the target primary base station may receive the second configuration information obtained by the source secondary base station according to the first configuration information, add the second configuration information to a handover acknowledge message, and send the handover acknowledge message to the source primary base station. The second configuration information may include at least one of the cell identity of the secondary cell group of the source secondary base station, the cell measurement information of the secondary cell group of the source secondary base station, the bearer configuration information of the secondary cell group of the source secondary base station, or the configuration of the primary secondary cell of the source secondary base station.

In this embodiment of the present disclosure, the source secondary base station remains unchanged in a process of handover from a primary base station to another primary base station, that is, the target primary base station decides to add a same secondary base station, that is, the source secondary base station, for the user equipment in a process of handover from the source primary base station to the target primary base station. There may be two implementation manners.

A first implementation manner may be implemented using a secondary base station addition procedure, where the target primary base station sends a secondary base station addition request to the source secondary base station, and instructs the source secondary base station to remain as the secondary base station of the user equipment.

For the first implementation manner, when the source primary base station receives the handover acknowledge message sent by the target primary base station, the source primary base station may trigger the source secondary base station to release a context of the user equipment and reserve a bearer.

A second implementation manner may be implemented using a secondary base station modification procedure, where the source primary base station sends a secondary base station modification request to the source secondary base station, and instructs the source secondary base station to remain as the secondary base station of the user equipment.

For the second implementation manner, optionally, the target primary base station sends, to the source secondary base station, a user equipment identity allocated by the source secondary base station, where the user equipment identity allocated by the source secondary base station is used by the source secondary base station to identify the user equipment, and is sent by the source primary base station to the target primary base station.

For the second implementation manner, optionally, the target primary base station receives transmission path information sent by the source secondary base station or the source primary base station, where the transmission path information is used by the target primary base station to complete switch of transmission paths between the source secondary base station and serving gateways.

For the second implementation manner, optionally, the target primary base station sends a second indication to the source primary base station, where the second indication is used to instruct the source primary base station to keep the source secondary base station as the secondary base station of the user equipment.

The handover acknowledge message may include the second indication, and the second indication is used to instruct the source primary base station to keep the source secondary base station as the secondary base station of the user equipment. The source primary base station keeps the source secondary base station as the secondary base station of the user equipment according to the second indication.

For example, when the source primary base station receives the second indication, the source primary base station does not request the source secondary base station to release the context of the user equipment, or does not send data forwarding information to the source secondary base station, or notifies the source secondary base station that data on all bearers or some bearers does not need to be forwarded. The second indication may also be an implicit indication, for example, the source primary base station may parse the second configuration information, and determine whether the source secondary base station is to be released or continues to be reserved.

In this embodiment, the source secondary base station may send the second configuration information to the user equipment. If the user equipment keeps a bearer of an original secondary base station unchanged, the user equipment may neither reset a borne Medium Access Control (MAC) entity, nor re-establish a borne Radio Link Control (RLC) entity according to the second configuration information, and the user equipment reconfigures a borne Packet Data Convergence Protocol (PDCP) according to a new security parameter (for example, a new secondary base station key (SKeNB) is derived according to a new base station key (KeNB), and then an encryption key for data transmission at the source secondary base station is derived). It may be understood that, when the bearer is not changed, a data radio bearer (DRB) between the user equipment and the source secondary base station remains unchanged, and original configurations, that is, the MAC and/or the RLC, may be used.

Figure 4:
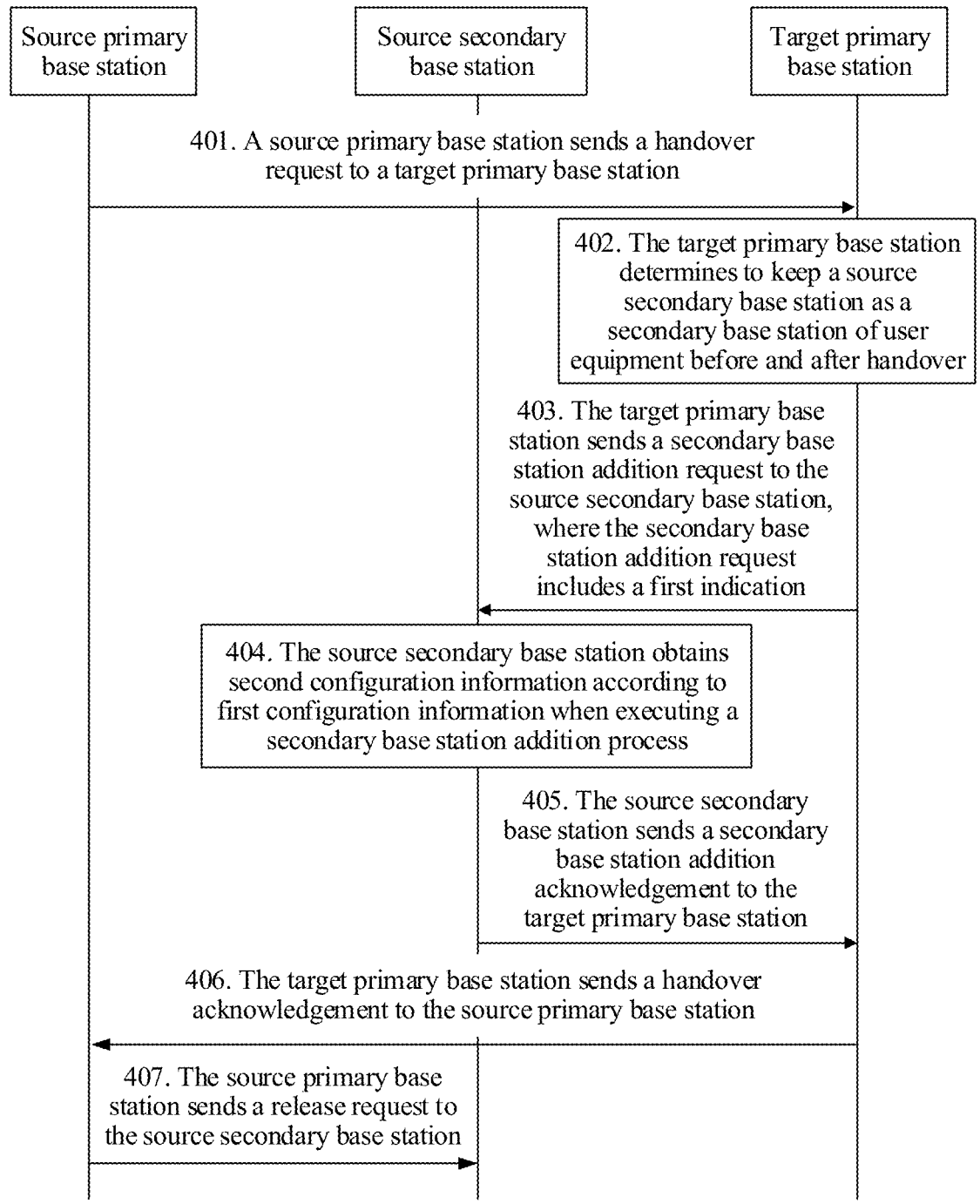
FIG. 4 is a schematic flowchart of a handover method according to an embodiment of the present disclosure.

The first implementation manner is used as an example in the following, that is, handover-based dual connectivity communication is described in detail using a secondary base station addition procedure. As shown in FIG. 4, this implementation manner is completed mainly by means of interaction between a source primary base station, a target primary base station, and a source secondary base station, and includes the following steps.

Step 401: A source primary base station sends a handover request to a target primary base station, where the handover request includes first configuration information of a source secondary base station.

For the first configuration information, reference may be made to the foregoing description, and details are not further described herein.

Step 402: The target primary base station determines to keep a source secondary base station as a secondary base station of user equipment before and after handover.

Optionally, the target primary base station determines, according to local configuration information and/or the first configuration information of the source secondary base station to keep the source secondary base station as the secondary base station of the user equipment before and after the handover.

For the local configuration information, reference may be made to the foregoing description, and details are not further described herein.

Optionally, the target primary base station receives a third indication sent by the source primary base station, where the third indication is used to instruct the target primary base station to keep the source secondary base station as the secondary base station of the user equipment. For example, the third indication is included in the handover request.

Optionally, the target primary base station may also reject the third indication according to a policy. For example, when load on the target primary base station is relatively light, and a secondary base station does not need to share data, the target primary base station may refuse to add the source secondary base station as the secondary base station serving the user equipment. For example, the target primary base station may notify, in a handover acknowledgement, the source primary base station that the target primary base station refuses to add the source secondary base station as the secondary base station serving the user equipment.

Step 403: The target primary base station sends a secondary base station addition request to the source secondary base station, where the secondary base station addition request includes a first indication.

For the first indication, reference may be made to the foregoing description, and details are not further described herein.

Step 404: The source secondary base station obtains second configuration information according to the first configuration information when executing a secondary base station addition process.

For the second configuration information, reference may be made to the foregoing description, and details are not further described herein.

Step 405: The source secondary base station sends a secondary base station addition acknowledgement to the target primary base station.

Optionally, the addition acknowledgement includes the second configuration information.

Step 406: The target primary base station sends a handover acknowledgement to the source primary base station.

Optionally, the handover acknowledgement includes the second configuration information, and the second configuration information is used to jointly provide services for the user equipment by the target primary base station and the source secondary base station.

Step 407: The source primary base station sends a release request to the source secondary base station.

The release request is used to request the source secondary base station to release a bearer of the user equipment or a context of the user equipment, or notify the source secondary base station that data forwarding information is to be sent to the source secondary base station, or notify the source secondary base station that data on all bearers or some bearers needs to be forwarded.

Figure 5:
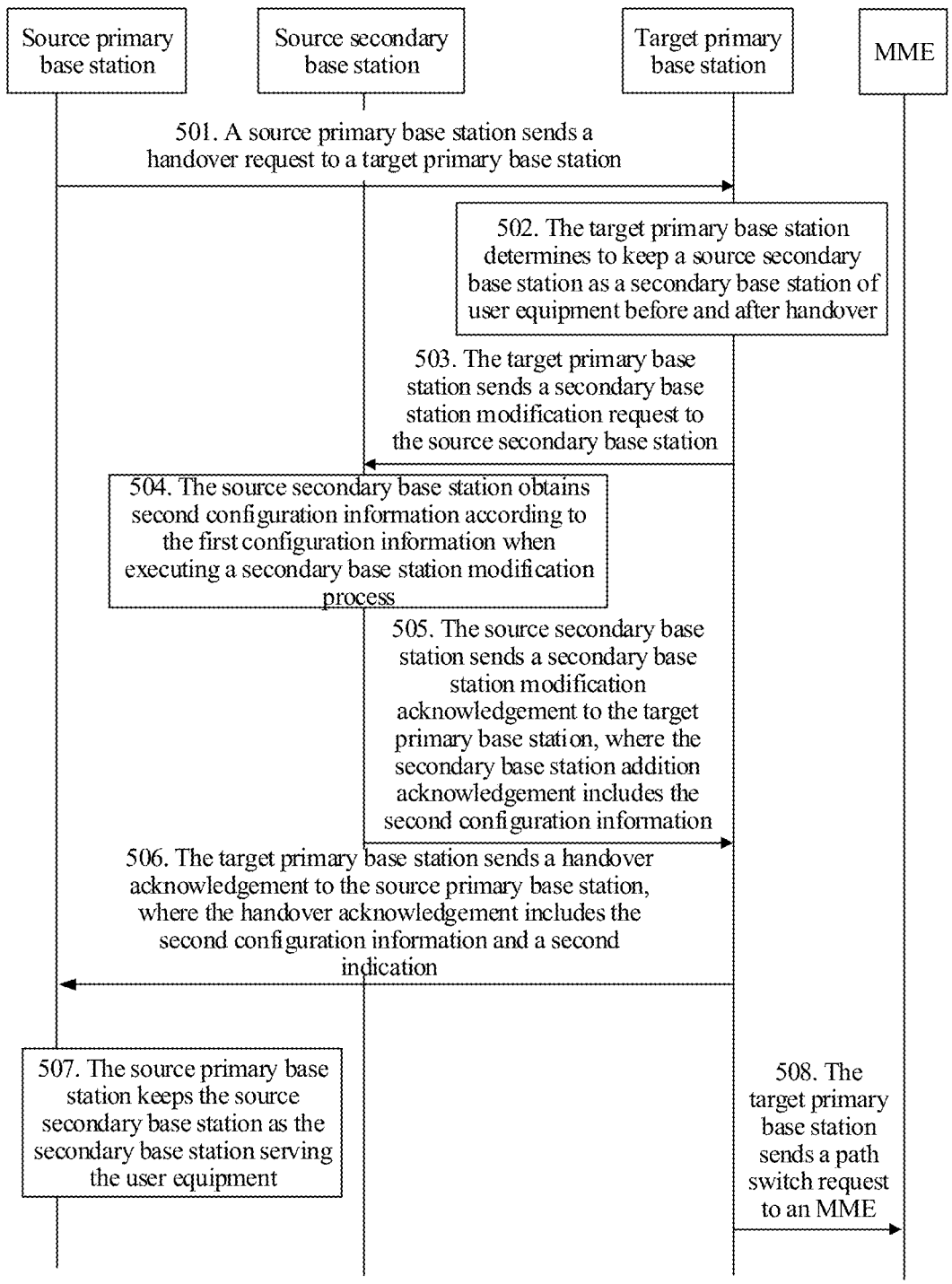
FIG. 5 is a schematic flowchart of a handover method according to an embodiment of the present disclosure.

The second implementation manner is used as an example in the following, that is, handover-based dual connectivity communication is described in detail using a secondary base station modification procedure. As shown in FIG. 5, this implementation manner is completed by means of interaction between a source primary base station, a target primary base station, an MME, and a source secondary base station, and includes the following steps.

Step 501: A source primary base station sends a handover request to a target primary base station, where the handover request includes first configuration information of a source secondary base station.

For the first configuration information, reference may be made to the foregoing description, and details are not further described herein.

Optionally, the handover request includes a user equipment identity allocated by the source secondary base station, for example, the user equipment identity allocated by the source secondary base station may be an X2 user equipment application identity (UE AP ID), or a cell radio network temporary identifier (C-RNTI). In this embodiment, the user equipment identity allocated by the source secondary base station may be used to indicate that the source secondary base station and the source primary base station provide services for the user equipment before handover, or used to indicate that the source secondary base station and the target primary base station provide services for the user equipment after handover.

Optionally, the handover request includes transmission path information sent by the source primary base station, where the transmission path information is used by the target primary base station to complete switch of transmission paths between the source secondary base station and serving gateways.

Step 502: The target primary base station determines to keep the source secondary base station as a secondary base station of user equipment before and after handover.

Optionally, the target primary base station determines, according to local configuration information and/or the first configuration information of the source secondary base station to keep the source secondary base station as the secondary base station of the user equipment before and after the handover.

For the local configuration information, reference may be made to the foregoing description, and details are not further described herein.

Optionally, the target primary base station receives a third indication sent by the source primary base station, where the third indication is used to instruct the target primary base station to keep the source secondary base station as the secondary base station of the user equipment. For example, the third indication is included in the handover request.

Optionally, the target primary base station may also reject the third indication according to a policy. For example, when load on the target primary base station is relatively light, and a secondary base station does not need to share data, the target primary base station may refuse to add the source secondary base station as the secondary base station serving the user equipment. For example, the target primary base station may notify, in a handover acknowledgement, the source primary base station that the target primary base station refuses to add the source secondary base station as the secondary base station serving the user equipment.

Step 503: The target primary base station sends a secondary base station modification request to the source secondary base station, where the secondary base station modification request includes a first indication.

Optionally, the secondary base station modification request includes the user equipment identity allocated by the source secondary base station. The secondary base station modification request may further include a user equipment identity. The user equipment identity may be a new identity allocated by the target primary base station.

The first indication is used to instruct the source secondary base station to remain unchanged. Further, the first indication may be used to instruct the source secondary base station to remain as the secondary base station serving the user equipment, and instruct to change a primary base station serving the user equipment from the source primary base station to the target primary base station. The first indication may also instruct the source secondary base station to remain unchanged in a handover procedure or based on a handover procedure. The first indication may be a new IE, or may be any other implicit or explicit indication. After the source secondary base station receives the first indication, a source secondary base station modification failure is not determined even repeated user equipment context information, a repeated bearer, or repeated user equipment subscription information is detected.

For example, when the first indication is the implicit indication, the first indication includes a user equipment identity (a source secondary base station user equipment application identity (S-SeNB UE AP ID) is used as an example) allocated by the source secondary base station and a user equipment identity (a target primary base station user equipment application identity (T-MeNB UE AP ID) is used as an example). Therefore, after receiving the secondary base station modification request, the source secondary base station learns, according to the user equipment identities carried by the target primary base station and a user equipment identity (a source primary base station user equipment application identity (S-MeNB UE AP ID) is used as an example) saved by the source secondary base station, that the primary base station serving the user equipment is changed from the source primary base station to the target primary base station. If a secondary base station modification request message does not include the first indication, the source secondary base station returns a secondary base station modification failure message to the target primary base station. If the secondary base station addition request message includes the first indication, the source secondary base station considers that repetition is allowed, and returns a secondary base station modification acknowledge message to the target primary base station. When the source secondary base station receives a user equipment identity that is allocated by the source secondary base station and that is the same as that stored in the source secondary base station, and user equipment identities allocated by different primary base stations, the first indication may be used to avoid a secondary base station modification procedure failure.

Step 504: The source secondary base station obtains second configuration information according to the first configuration information when executing a secondary base station modification process.

For the second configuration information, reference may be made to the foregoing description, and details are not further described herein.

Optionally, in a process in which the source secondary base station performs modification, the source secondary base station modifies, according to a context of the user equipment, a locally stored context of the user equipment allocated by the source primary base station.

Step 505: The source secondary base station sends a secondary base station modification acknowledgement to the target primary base station, where the secondary base station addition acknowledgement includes the second configuration information.

Step 506: The target primary base station sends a handover acknowledgement to the source primary base station, where the handover acknowledgement includes the second configuration information and a second indication.

Optionally, the second configuration information is used to jointly provide services for the user equipment by the target primary base station and the source secondary base station. The second indication is used to instruct the source primary base station to keep the source secondary base station as the secondary base station of the user equipment. The source primary base station keeps the source secondary base station as the secondary base station of the user equipment according to the second indication. The second indication may also instruct the source secondary base station to remain unchanged in a handover procedure or based on a handover procedure.

Step 507: The source primary base station keeps the source secondary base station as the secondary base station serving the user equipment.

Optionally, after receiving the handover acknowledgement, the source primary base station does not send a secondary base station release request to the source secondary base station according to the second indication. For example, the source primary base station does not trigger the source secondary base station to release a bearer of the user equipment or the context of the user equipment, or the source primary base station keeps the source secondary base station as the user equipment serving the user equipment.

Optionally, when the source primary base station receives the second indication, the source primary base station does not request the source secondary base station to release the context of the user equipment, or does not send data forwarding information to the source secondary base station, or notifies the source secondary base station that data on all bearers or some bearers does not need to be forwarded. The second indication may also be an implicit indication, for example, the source primary base station may parse the second configuration information, and determine whether the source secondary base station is to be released or continues to be reserved. For another example, if the user equipment keeps a bearer of an original secondary base station unchanged, the user equipment may neither reset a borne MAC entity nor re-establish a borne RLC entity according to the second configuration information, and the user equipment reconfigures a borne PDCP entity according to a new security parameter (for example, a new SKeNB is derived according to a new KeNB, and then an encryption key for data transmission at the source secondary base station is derived).

Step 508: The target primary base station sends a path switch request to an MME.

The path switch request includes transmission path information, where the transmission path information may be obtained according to transmission path information sent by the source secondary base station or the source primary base station, and is used to complete switch of transmission paths between the source secondary base station and serving gateways. For example, the transmission path information sent by the target primary base station to the MME may include the transmission path information obtained from the source secondary base station or the source primary base station, and transmission path information.

Optionally, the path switch request that carries only information about a bearer whose transmission path information changes is sent to a serving gateway. For example, the target primary base station sends an indication message to the MME, and the indication message is used to indicate that the MME needs to update information about a bearer whose transmission path information is changed.

In this embodiment, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Embodiment 2

Figure 6:
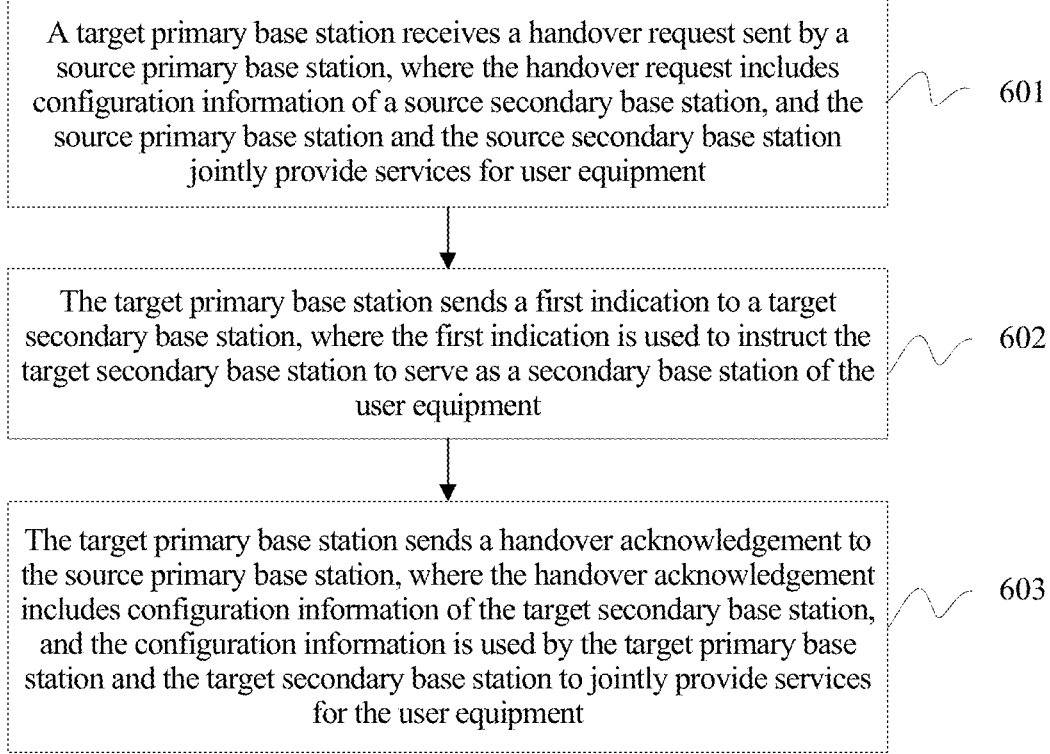
FIG. 6 is a schematic flowchart of a handover method according to an embodiment of the present disclosure.

As shown in FIG. 6, an embodiment of the present disclosure provides a handover method, and the method is executed by a target primary base station and includes the following steps.

Step 601: A target primary base station receives a handover request sent by a source primary base station, where the handover request includes configuration information of a source secondary base station, and the source primary base station and the source secondary base station jointly provide services for user equipment.

Step 602: The target primary base station sends a first indication to a target secondary base station, where the first indication is used to instruct the target secondary base station to serve as a secondary base station of the user equipment.

Step 603: The target primary base station sends a handover acknowledgement to the source primary base station, where the handover acknowledgement includes configuration information of the target secondary base station, and the configuration information is used by the target primary base station and the target secondary base station to jointly provide services for the user equipment.

In this embodiment, the configuration information of the source secondary base station may be configuration information of a secondary cell group of the source secondary base station. For example, the configuration information of the source secondary base station may include at least one of a cell identity of the secondary cell group of the source secondary base station, cell measurement information of the secondary cell group of the source secondary base station, bearer configuration information of the secondary cell group of the source secondary base station, or a configuration of a primary secondary cell of the source secondary base station. The cell measurement information may be a measurement result of RSRP, and the bearer configuration information may be a bearer type (for example, a secondary cell group bearer, or a split bearer), or a QoS parameter of a bearer. The target primary base station may determine, according to the configuration information of the source secondary base station and/or local configuration information of the target primary base station, whether to change the secondary base station of the user equipment to the target secondary base station. For example, the local configuration information of the target primary base station may be at least one of the following: whether the target primary base station supports a dual connectivity feature, whether the target primary base station supports a function of keeping the source secondary base station unchanged, or a load status of the target primary base station.

In this embodiment, the first indication may be further used to instruct the target secondary base station to serve as the secondary base station serving the user equipment, instruct to change a primary base station serving the user equipment from the source primary base station to the target primary base station, and instruct the target primary base station and the target secondary base station to jointly provide services for the user equipment.

For example, when determining that the target secondary base station is used as the secondary base station serving the user equipment, the target primary base station sends a secondary base station addition request to the target secondary base station. The secondary base station addition request includes the first indication, where the first indication is used to instruct to add the target secondary base station as the secondary base station serving the user equipment. The first indication may also instruct to add, in a handover procedure or based on a handover procedure, the target secondary base station as the secondary base station serving the user equipment.

In this embodiment of the present disclosure, the target primary base station may receive a third indication sent by the source primary base station, where the third indication is used to instruct the target primary base station to add the target secondary base station as the secondary base station serving the user equipment.

Therefore, in this embodiment, it may be implemented that the target secondary base station is added as the secondary base station serving the user equipment in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the target primary base station obtains the configuration information of the target secondary base station. For example, a secondary base station addition acknowledgement that is sent by the target secondary base station and received by the target primary base station includes the configuration information of the target secondary base station, the configuration information of the target secondary base station is added to a handover acknowledge message, and the handover acknowledge message is sent to the source primary base station. The configuration information of the target secondary base station may include at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

In this embodiment of the present disclosure, the target primary base station receives first transmission path information sent by the target secondary base station, where the first transmission path information is allocated by the target secondary base station and is used for data transmission between the target secondary base station and a serving gateway. For example, the secondary base station addition acknowledgement that is sent by the target secondary base station and received by the target primary base station includes the first transmission path information (that is, an IP address and a GTP tunnel identifier). The first transmission path information is not limited to be included in the secondary base station addition acknowledgement.

In this embodiment of the present disclosure, the target primary base station sends second transmission path information to the target secondary base station, where the second transmission path information is allocated by the serving gateway and is used for data transmission between the target secondary base station and the serving gateway. For example, after receiving the first transmission path information sent by the target secondary base station, the target primary base station saves the first transmission path information, adds the first transmission path information to a path switch request, and sends the path switch request to an MME. The target primary base station receives a path switch request completion message fed back by the MME, and the path switch request completion message includes the second transmission path information. The target primary base station sends the second transmission path information to the target secondary base station such that the target secondary base station performs data transmission with the serving gateway using the second transmission path information. The second transmission path information may also be included in a dual connectivity dedicated message (for example, a bearer modification indication or a bearer modification completion message). A message used to bear the second transmission path information is not limited in this embodiment of the present disclosure.

In this embodiment of the present disclosure, the target primary base station sends a second indication to the source primary base station, where the second indication is used to indicate that the target primary base station adds the target secondary base station as the secondary base station of the user equipment. The handover acknowledgement sent by the target primary base station to the source primary base station includes the second indication, and the second indication may also instruct to add, in a handover procedure or based on a handover procedure, the target secondary base station as the secondary base station serving the user equipment. The source primary base station adds, according to the second indication, the target secondary base station as the secondary base station serving the user equipment.

For example, when the source primary base station receives the second indication, the source primary base station requests the source secondary base station to release a context of the user equipment, or sends data forwarding information to the source secondary base station, or notifies the source secondary base station that data on all bearers or some bearers needs to be forwarded. The second indication may also be an implicit indication, for example, the source primary base station may parse the configuration information of the target secondary base station, and determine to release the source secondary base station.

Figure 7:
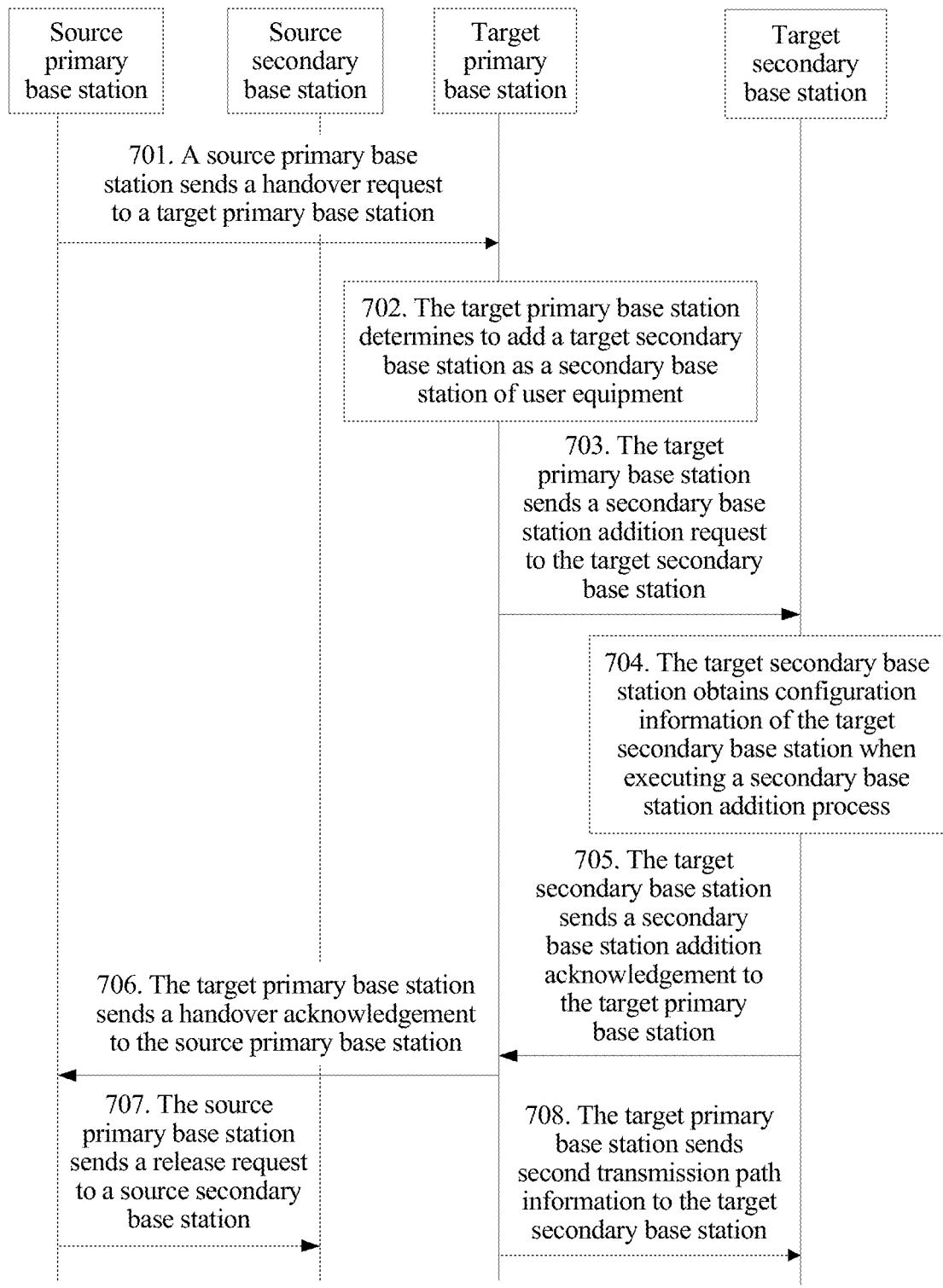
FIG. 7 is a schematic flowchart of a handover method according to an embodiment of the present disclosure.

That a secondary base station of user equipment changes from a source secondary base station to a target secondary base station in a process of handover of the user equipment from a primary base station to another primary base station is used as an example in the following, to describe in detail handover-based dual connectivity communication. As shown in FIG. 7, this implementation manner is completed mainly by means of interaction between a source primary base station, a target primary base station, a target secondary base station, and a source secondary base station, and includes the following steps.

Step 701: A source primary base station sends a handover request to a target primary base station, where the handover request includes configuration information of a source secondary base station.

For the configuration information of the source secondary base station, reference may be made to the foregoing description, and details are not further described herein.

Step 702: The target primary base station determines to add a target secondary base station as a secondary base station of user equipment.

Optionally, the target primary base station determines, according to local configuration information and/or the first configuration information of the source secondary base station, to add the target secondary base station as the secondary base station of the user equipment.

For the local configuration information, reference may be made to the foregoing description, and details are not further described herein.

Optionally, the target primary base station receives a third indication sent by the source primary base station, where the third indication is used to instruct the target primary base station to add the target secondary base station as the secondary base station of the user equipment. For example, the third indication is included in the handover request.

Step 703: The target primary base station sends a secondary base station addition request to the target secondary base station.

The secondary base station addition request includes a first indication and first transmission path information.

For the first indication and the first transmission path information, reference may be made to the foregoing description, and details are not further described herein.

Step 704: The target secondary base station obtains configuration information of the target secondary base station when executing a secondary base station addition process.

For the configuration information of the target secondary base station, reference may be made to the foregoing description, and details are not further described herein.

Step 705: The target secondary base station sends a secondary base station addition acknowledgement to the target primary base station.

Optionally, the addition acknowledgement includes the configuration information of the target secondary base station and first transmission path information of the target secondary base station, and the first transmission path information is allocated by the target secondary base station and is used for data transmission between the target secondary base station and a serving gateway.

Step 706: The target primary base station sends a handover acknowledgement to the source primary base station.

Optionally, the handover acknowledgement includes the configuration information of the target secondary base station and a second indication. For the configuration information of the target secondary base station and the second indication, reference may be made to the foregoing description, and details are not further described herein.

Step 707: The source primary base station sends a release request to the source secondary base station.

The release request is used to request the source secondary base station to release a context of the user equipment, or notify the source secondary base station that data forwarding information is to be sent to the source secondary base station, or notify the source secondary base station that data on all bearers or some bearers needs to be forwarded. The second indication may also be an implicit indication, for example, the source primary base station may parse the configuration information of the target secondary base station, and determine to release the source secondary base station.

Step 708: The target primary base station sends second transmission path information to the target secondary base station.

For the second transmission path information, reference may be made to the foregoing description, and details are not further described herein.

In this embodiment, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Embodiment 3

Figure 8:
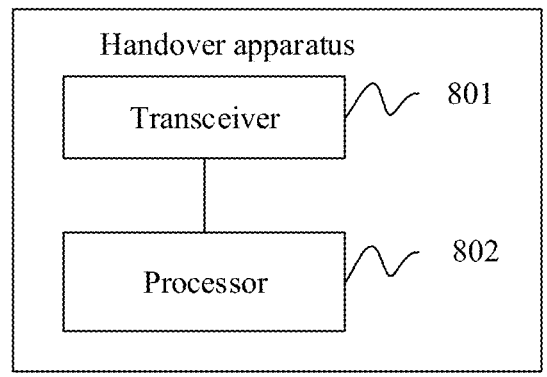
FIG. 8 is a schematic structural diagram of a handover apparatus according to an embodiment of the present disclosure.

Corresponding to Embodiment 1, as shown in FIG. 8, this embodiment of the present disclosure provides a handover apparatus, and the apparatus shown in FIG. 8 may be a target primary base station, or a target primary base station uses the apparatus shown in FIG. 8 to perform handover from a base station to another base station. The apparatus shown in FIG. 8 includes a transceiver 801 configured to receive a handover request sent by a source primary base station, where the handover request includes first configuration information of a source secondary base station, and the source primary base station and the source secondary base station jointly provide services for user equipment, and a processor 802 configured to trigger the transceiver 801 to send a first indication to the source secondary base station, where the first indication is used to instruct the source secondary base station to remain unchanged, and trigger the transceiver 801 to send a handover acknowledgement to the source primary base station, where the handover acknowledgement includes second configuration information of the source secondary base station, and the second configuration information is used to jointly provide services for the user equipment by the target primary base station and the source secondary base station.

The transceiver 801 is further configured to send the first indication to the source secondary base station, and send the handover acknowledgement to the source primary base station.

In this embodiment, the first indication is used to instruct the source secondary base station to remain as a secondary base station serving the user equipment, and instruct to change a primary base station serving the user equipment from the source primary base station to the target primary base station.

For example, when determining to keep the source secondary base station as the secondary base station of the user equipment before and after handover, the processor 802 may trigger the transceiver 801 to send a secondary base station addition request or a secondary base station modification request to the source secondary base station. The secondary base station addition request and the secondary base station modification request are respectively corresponding to a scenario in which a secondary base station is added and a scenario in which a secondary base station is modified in Embodiment 1. For a specific scenario in which the secondary base station is added or modified, reference may be made to description in Embodiment 1, and details are not further described herein.

In this embodiment of the present disclosure, the transceiver 801 may receive a third indication sent by the source primary base station, where the third indication is used to instruct the target primary base station to keep the source secondary base station as the secondary base station of the user equipment.

Therefore, in this embodiment, it may be implemented that a secondary base station remains unchanged in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the transceiver 801 may obtain the second configuration information according to the first configuration information. For example, the transceiver 801 may receive the second configuration information that is obtained according to the first configuration information and sent by the source secondary base station, add the second configuration information to a handover acknowledge message, and send the handover acknowledge message to the source primary base station. The second configuration information may include at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station.

In this embodiment of the present disclosure, the source secondary base station remains unchanged in a process of handover from a primary base station to another primary base station, that is, the target primary base station decides to add a same secondary base station, that is, the source secondary base station, for the user equipment in a process of handover from the source primary base station to the target primary base station. There may be two implementation manners.

A first implementation manner may be implemented using a secondary base station addition procedure, where the target primary base station sends a secondary base station addition request to the source secondary base station using the transceiver 801, and instructs the source secondary base station to remain as the secondary base station of the user equipment.

For the first implementation manner, when the source primary base station receives the handover acknowledge message sent by the transceiver 801, the source primary base station may trigger the source secondary base station to release a context of the user equipment and reserve a bearer.

A second implementation manner may be implemented using a secondary base station modification procedure, where the target primary base station sends a secondary base station modification request to the source secondary base station using the transceiver 801, and instructs the source secondary base station to remain as the secondary base station of the user equipment.

For the second implementation manner, optionally, the transceiver 801 sends, to the source secondary base station, a user equipment identity allocated by the source secondary base station, where the user equipment identity allocated by the source secondary base station is used by the source secondary base station to identify the user equipment, and is sent by the source primary base station to the target primary base station.

For the second implementation manner, optionally, the transceiver 801 receives transmission path information sent by the source secondary base station or the source primary base station, where the transmission path information is used by the target primary base station to complete switch of transmission paths between the source secondary base station and serving gateways.

For the second implementation manner, optionally, the transceiver 801 sends a second indication to the source primary base station, where the second indication is used to instruct the source primary base station to keep the source secondary base station as the secondary base station of the user equipment.

The handover acknowledge message may include the second indication, and the second indication is used to instruct the source primary base station to keep the source secondary base station as the secondary base station of the user equipment. The source primary base station keeps the source secondary base station as the secondary base station of the user equipment according to the second indication.

For example, when the source primary base station receives the second indication, the source primary base station does not request the source secondary base station to release the context of the user equipment, or does not send data forwarding information to the source secondary base station, or notifies the source secondary base station that data on all bearers or some bearers does not need to be forwarded. The second indication may also be an implicit indication, for example, the source primary base station may parse the second configuration information, and determine whether the source secondary base station is to be released or continues to be reserved.

In this embodiment, the source secondary base station may send the second configuration information to the user equipment. If the user equipment keeps a bearer of an original secondary base station unchanged, the user equipment may neither reset a borne MAC entity nor re-establish a borne RLC entity, according to the second configuration information, and the user equipment reconfigures a borne PDCP entity according to a new security parameter (for example, a new SKeNB is derived according to a new KeNB, and then an encryption key for data transmission at the source secondary base station is derived). It may be understood that, when the bearer is not changed, DRB between the user equipment and the source secondary base station remains unchanged, and original configurations, that is, the MAC and/or the RLC, may be used.

Using the apparatus shown in FIG. 8, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Figure 9:
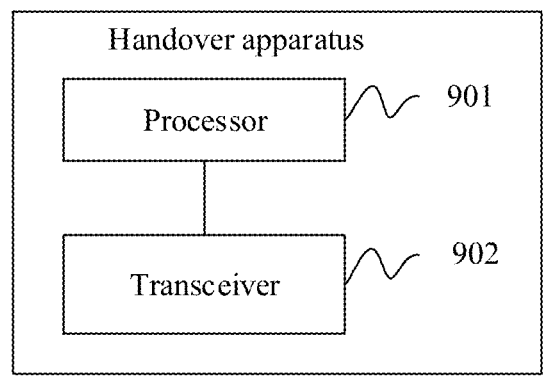
FIG. 9 is a schematic structural diagram of a handover apparatus according to an embodiment of the present disclosure.

Corresponding to Embodiment 1, as shown in FIG. 9, this embodiment of the present disclosure provides a handover apparatus, and the apparatus shown in FIG. 9 may be a source primary base station, or a source primary base station uses the apparatus shown in FIG. 9 to perform handover from a base station to another base station. The apparatus shown in FIG. 9 includes a processor 901 configured to trigger a transceiver 902 to send a handover request to a target primary base station, where the handover request includes first configuration information of a source secondary base station, and the source primary base station and the source secondary base station jointly provide services for user equipment, and the transceiver 902 configured to send the handover request to the target primary base station, and receive a handover acknowledgement sent by the target primary base station, where the handover acknowledgement includes second configuration information of the source secondary base station, and the second configuration information is used to jointly provide services for the user equipment by the target primary base station and the source secondary base station.

The second configuration information of the source secondary base station is based on a first indication sent by the target primary base station to the source secondary base station, and the first indication is used to instruct the source secondary base station to remain unchanged.

In this embodiment of the present disclosure, for the first configuration information and the second configuration information, reference may be made to the foregoing description, and details are not further described herein.

In this embodiment of the present disclosure, the first indication is used to instruct the source secondary base station to remain as a secondary base station serving the user equipment, and instruct to change a primary base station serving the user equipment from the source primary base station to the target primary base station.

In this embodiment of the present disclosure, optionally, the processor 901 is further configured to trigger the transceiver 902 to send, to the target primary base station, a user equipment identity allocated by the source secondary base station such that the target primary base station sends, to the source secondary base station, the user equipment identity allocated by the source secondary base station, where the user equipment identity allocated by the source secondary base station is used by the source secondary base station to identify the user equipment, and the transceiver 902 is further configured to send, to the target primary base station, the user equipment identity allocated by the source secondary base station.

In this embodiment of the present disclosure, based on a scenario in which a secondary base station is modified, optionally, the processor 901 is further configured to trigger the transceiver 902 to send transmission path information to the target primary base station, where the transmission path information is used by the target primary base station to complete switch of transmission paths between the source secondary base station and serving gateways, and the transceiver 902 is further configured to send the transmission path information to the target primary base station.

In this embodiment of the present disclosure, optionally, the transceiver 902 is further configured to receive a second indication sent by the target primary base station, where the second indication is used to instruct the source primary base station to keep the source secondary base station as the secondary base station of the user equipment, and the processor 901 is further configured to keep the source secondary base station as the secondary base station of the user equipment according to the second indication received by the transceiver 902.

In this embodiment of the present disclosure, based on a scenario in which a secondary base station is added, optionally, the processor 901 is further configured to trigger, according to the handover acknowledgement received by the transceiver 902, the source secondary base station to release a bearer of the user equipment or a context of the user equipment.

In this embodiment of the present disclosure, optionally, the processor 901 is further configured to trigger the transceiver 902 to send a third indication to the target primary base station, where the third indication is used to instruct the target primary base station to keep the source secondary base station as the secondary base station of the user equipment, and the transceiver 902 is further configured to send the third indication to the target primary base station.

Using the apparatus shown in FIG. 9, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Figure 10:
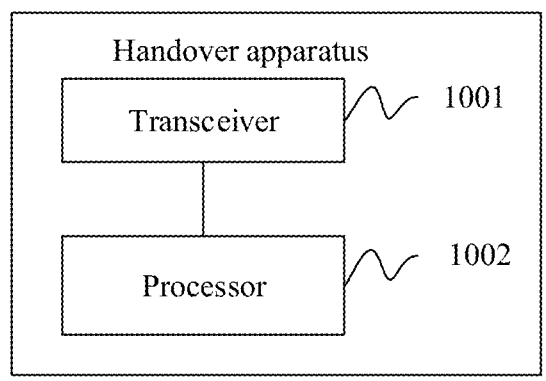
FIG. 10 is a schematic structural diagram of a handover apparatus according to an embodiment of the present disclosure.

Corresponding to Embodiment 1, as shown in FIG. 10, this embodiment of the present disclosure provides a handover apparatus, and the apparatus shown in FIG. 10 may be a source secondary base station, or a source secondary base station uses the apparatus shown in FIG. 10 to perform handover from a base station to another base station. The apparatus shown in FIG. 10 includes a transceiver 1001 configured to receive a first indication sent by a target primary base station, where the first indication is used to instruct the source secondary base station to remain unchanged.

The first indication is based on a handover request that is sent by a source primary base station and that is received by the target primary base station, where the handover request includes first configuration information of the source secondary base station, and the source primary base station and the source secondary base station jointly provide services for user equipment, and the handover request is used by the target primary base station to send a handover acknowledgement to the source primary base station, where the handover acknowledgement includes second configuration information of the source secondary base station, and the second configuration information is used to jointly provide services for the user equipment by the target primary base station and the source secondary base station.

In this embodiment of the present disclosure, for the first configuration information and the second configuration information, reference may be made to the foregoing description, and details are not further described herein.

In this embodiment of the present disclosure, the first indication is used to instruct the source secondary base station to remain as a secondary base station serving the user equipment, and instruct to change a primary base station serving the user equipment from the source primary base station to the target primary base station.

In this embodiment of the present disclosure, optionally, the transceiver 1001 is further configured to receive a user equipment identity that is allocated by the source secondary base station and sent by the target primary base station, where the user equipment identity allocated by the source secondary base station is used by the source secondary base station to identify the user equipment, and is sent by the source primary base station to the target primary base station.

In this embodiment of the present disclosure, based on a scenario in which a secondary base station is modified, optionally, the apparatus shown in FIG. 10 further includes a processor 1002 configured to trigger the transceiver 1001 to send transmission path information to the target primary base station, where the transmission path information is used by the target primary base station to complete switch of transmission paths between the source secondary base station and serving gateways.

The transceiver 1001 is further configured to send the transmission path information to the target primary base station.

Using the apparatus shown in FIG. 10, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Embodiment 4

Figure 11:
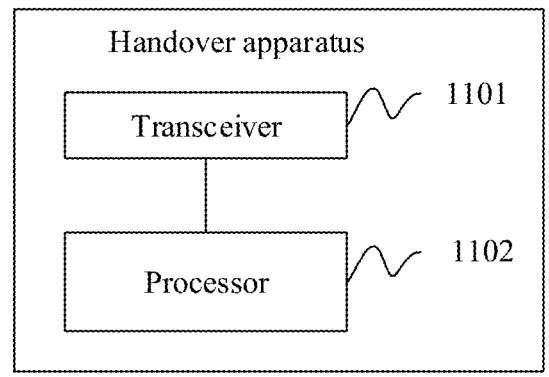
FIG. 11 is a schematic structural diagram of a handover apparatus according to an embodiment of the present disclosure.

Corresponding to Embodiment 2, as shown in FIG. 11, this embodiment of the present disclosure provides a handover apparatus, and the apparatus shown in FIG. 11 may be a target primary base station, or a target primary base station uses the apparatus shown in FIG. 11 to perform handover from a base station to another base station. The apparatus shown in FIG. 11 includes a transceiver 1101 configured to receive a handover request sent by a source primary base station, where the handover request includes configuration information of a source secondary base station, and the source primary base station and the source secondary base station jointly provide services for user equipment, and a processor 1102 configured to trigger the transceiver 1101 to send a first indication to a target secondary base station, where the first indication is used to instruct the target secondary base station to serve as a secondary base station of the user equipment, and trigger the transceiver 1101 to send a handover acknowledgement to the source primary base station, where the handover acknowledgement includes configuration information of the target secondary base station, and the configuration information is used by the target primary base station and the target secondary base station to jointly provide services for the user equipment.

The transceiver 1101 is further configured to send the first indication to the target secondary base station, and send the handover acknowledgement to the source primary base station.

In this embodiment, the configuration information of the source secondary base station may be configuration information of a secondary cell group of the source secondary base station. For example, the configuration information of the source secondary base station may include at least one of a cell identity of the secondary cell group of the source secondary base station, cell measurement information of the secondary cell group of the source secondary base station, bearer configuration information of the secondary cell group of the source secondary base station, or a configuration of a primary secondary cell of the source secondary base station. The cell measurement information may be a measurement result of RSRP, and the bearer configuration information may be a bearer type (for example, a secondary cell group bearer, or a split bearer), or a QoS parameter of a bearer. The processor 1102 may determine, according to the configuration information of the source secondary base station and/or local configuration information of the target primary base station, whether to change the secondary base station of the user equipment to the target secondary base station. For example, the local configuration information of the target primary base station may be at least one of the following: whether the target primary base station supports a dual connectivity feature, whether the target primary base station supports a function of keeping the source secondary base station unchanged, or a load status of the target primary base station.

In this embodiment, the first indication may be used to instruct the target secondary base station to serve as the secondary base station serving the user equipment, instruct to change a primary base station serving the user equipment from the source primary base station to the target primary base station, and instruct the target primary base station and the target secondary base station to jointly provide services for the user equipment.

For example, when determining that the target secondary base station is used as the secondary base station serving the user equipment, the transceiver 1101 sends a secondary base station addition request to the target secondary base station. The secondary base station addition request includes the first indication, where the first indication is used to instruct to add the target secondary base station as the secondary base station serving the user equipment. The first indication may also instruct to add, in a handover procedure or based on a handover procedure, the target secondary base station as the secondary base station serving the user equipment.

In this embodiment of the present disclosure, the transceiver 1101 may receive a third indication sent by the source primary base station, where the third indication is used to instruct the target primary base station to add the target secondary base station as the secondary base station serving the user equipment.

Therefore, in this embodiment, it may be implemented that the target secondary base station is added as the secondary base station serving the user equipment in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the target primary base station obtains the configuration information of the target secondary base station. For example, a secondary base station addition acknowledgement that is sent by the target secondary base station and received by the transceiver 1101 includes the configuration information of the target secondary base station, the configuration information of the target secondary base station is added to a handover acknowledge message, and the handover acknowledge message is sent to the source primary base station. The configuration information of the target secondary base station may include at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

In this embodiment of the present disclosure, the transceiver 1101 receives first transmission path information sent by the target secondary base station, where the first transmission path information is allocated by the target secondary base station and is used for data transmission between the target secondary base station and a serving gateway. For example, the secondary base station addition acknowledgement that is sent by the target secondary base station and received by the transceiver 1101 includes the first transmission path information (that is, an IP address and a GTP tunnel identifier). The first transmission path information is not limited to be included in the secondary base station addition acknowledgement.

In this embodiment of the present disclosure, the transceiver 1101 sends second transmission path information to the target secondary base station, where the second transmission path information is allocated by the serving gateway and is used for data transmission between the target secondary base station and the serving gateway. For example, after receiving the first transmission path information sent by the target secondary base station, the transceiver 1101 adds the first transmission path information to a path switch request, and sends the path switch request to an MIME. The transceiver 1101 receives a path switch request completion message fed back by the MME, and the path switch request completion message includes the second transmission path information. The transceiver 1101 sends the second transmission path information to the target secondary base station such that the target secondary base station performs data transmission with the serving gateway using the second transmission path information. The second transmission path information may also be included in a dual connectivity dedicated message (for example, a bearer modification indication or a bearer modification completion message). A message used to bear the second transmission path information is not limited in this embodiment of the present disclosure.

In this embodiment of the present disclosure, the transceiver 1101 sends a second indication to the source primary base station, where the second indication is used to indicate that the target primary base station adds the target secondary base station as the secondary base station of the user equipment. The handover acknowledgement sent by the transceiver 1101 to the source primary base station includes the second indication, and the second indication may also instruct to add, in a handover procedure or based on a handover procedure, the target secondary base station as the secondary base station serving the user equipment. The source primary base station adds, according to the second indication, the target secondary base station as the secondary base station serving the user equipment.

For example, when the source primary base station receives the second indication, the source primary base station requests the source secondary base station to release a context of the user equipment, or sends data forwarding information to the source secondary base station, or notifies the source secondary base station that data on all bearers or some bearers needs to be forwarded. The second indication may also be an implicit indication, for example, the source primary base station may parse the configuration information of the target secondary base station, and determine to release the source secondary base station.

Using the apparatus shown in FIG. 11, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Figure 12:
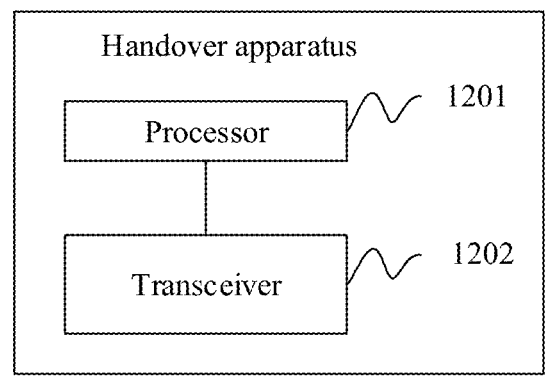
FIG. 12 is a schematic structural diagram of a handover apparatus according to an embodiment of the present disclosure.

Corresponding to Embodiment 2, as shown in FIG. 12, this embodiment of the present disclosure provides a handover apparatus, and the apparatus shown in FIG. 12 may be a source primary base station, or a source primary base station uses the apparatus shown in FIG. 12 to perform handover from a base station to another base station. The apparatus shown in FIG. 12 includes a processor 1201 configured to trigger a transceiver 1202 to send a handover request to a target primary base station, where the handover request includes configuration information of a source secondary base station, and the source primary base station and the source secondary base station jointly provide services for user equipment, and the transceiver 1202 configured to send the handover request to the target primary base station, and receive a handover acknowledgement sent by the target primary base station, where the handover acknowledgement includes configuration information of a target secondary base station, and the configuration information is used by the target primary base station and the target secondary base station to jointly provide services for the user equipment.

The handover acknowledgement is based on a first indication sent by the target primary base station to the target secondary base station, and the first indication is used to instruct the target secondary base station to serve as a secondary base station of the user equipment.

In this embodiment of the present disclosure, for the configuration information of the source secondary base station and the configuration information of the target secondary base station, reference may be made to the foregoing description, and details are not further described herein.

In this embodiment of the present disclosure, the transceiver 1202 is further configured to receive a second indication sent by the target primary base station, where the second indication is used to indicate that the target primary base station adds the target secondary base station as the secondary base station of the user equipment.

In this embodiment of the present disclosure, the processor 1201 is further configured to release a bearer of the user equipment or a context of the user equipment according to the second indication received by the transceiver 1202.

Using the apparatus shown in FIG. 12, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Figure 13:
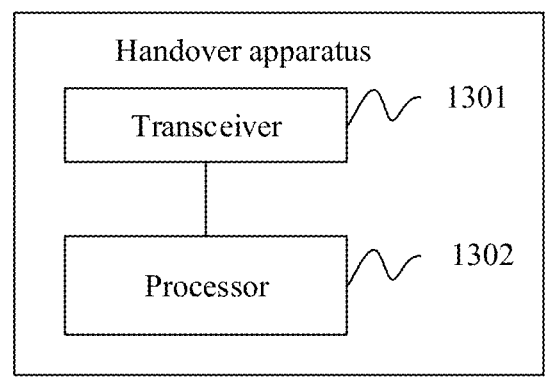
FIG. 13 is a schematic structural diagram of a handover apparatus according to an embodiment of the present disclosure.

Corresponding to Embodiment 2, as shown in FIG. 13, this embodiment of the present disclosure provides a handover apparatus, and the apparatus shown in FIG. 13 may be a target secondary base station, or a target secondary base station uses the apparatus shown in FIG. 13 to perform handover from a base station to another base station. The apparatus shown in FIG. 13 includes a transceiver 1301 configured to receive a first indication sent by a target primary base station, where the first indication is used to instruct the target secondary base station to serve as a secondary base station of user equipment.

The first indication is based on a handover request that is sent by a source primary base station and that is received by the target primary base station, where the handover request includes configuration information of a source secondary base station, and the source primary base station and the source secondary base station provide services for the user equipment together, and the handover request is used by the target primary base station to send a handover acknowledgement to the source primary base station, where the handover acknowledgement includes configuration information of the target secondary base station, and the configuration information is used by the target primary base station and the target secondary base station to jointly provide services for the user equipment.

In this embodiment of the present disclosure, for the configuration information of the source secondary base station and the configuration information of the target secondary base station, reference may be made to the foregoing description, and details are not further described herein.

In this embodiment of the present disclosure, the apparatus shown in FIG. 13 further includes a processor 1302 configured to trigger the transceiver 1301 to send first transmission path information to the target primary base station, where the first transmission path information is allocated by the target secondary base station and is used for data transmission between the target secondary base station and a serving gateway.

The transceiver 1301 is further configured to send the first transmission path information to the target primary base station, and receive second transmission path information sent by the target primary base station, where the second transmission path information is allocated by the serving gateway and is used for data transmission between the target secondary base station and the serving gateway.

In this embodiment of the present disclosure, the first indication is used by the target primary base station to send a second indication to the source secondary base station, and the second indication is used to indicate that the target primary base station adds the target secondary base station as the secondary base station of the user equipment.

Using the apparatus shown in FIG. 13, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Embodiment 5

Figure 14:
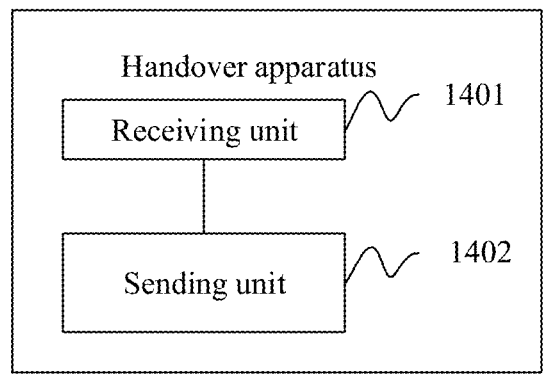
FIG. 14 is a schematic structural diagram of a handover apparatus according to an embodiment of the present disclosure.

Corresponding to Embodiment 1, as shown in FIG. 14, this embodiment of the present disclosure provides a handover apparatus, and the apparatus shown in FIG. 14 may be a target primary base station, or a target primary base station uses the apparatus shown in FIG. 14 to perform handover from a base station to another base station. The apparatus shown in FIG. 14 includes a receiving unit 1401 configured to receive a handover request sent by a source primary base station, where the handover request includes first configuration information of a source secondary base station, and the source primary base station and the source secondary base station jointly provide services for user equipment, and a sending unit 1402 configured to send a first indication to the source secondary base station, where the first indication is used to instruct the source secondary base station to remain unchanged, and send a handover acknowledgement to the source primary base station, where the handover acknowledgement includes second configuration information of the source secondary base station, and the second configuration information is used to jointly provide services for the user equipment by the target primary base station and the source secondary base station.

In this embodiment, the first indication is used to instruct the source secondary base station to remain as a secondary base station serving the user equipment, and instruct to change a primary base station serving the user equipment from the source primary base station to the target primary base station.

For example, when determining to keep the source secondary base station as the secondary base station of the user equipment before and after handover, the sending unit 1402 may send a secondary base station addition request or a secondary base station modification request to the source secondary base station. The secondary base station addition request and the secondary base station modification request are respectively corresponding to a scenario in which a secondary base station is added and a scenario in which a secondary base station is modified in Embodiment 1. For a specific scenario in which the secondary base station is added or modified, reference may be made to description in Embodiment 1, and details are not further described herein.

In this embodiment of the present disclosure, the receiving unit 1401 may receive a third indication sent by the source primary base station, where the third indication is used to instruct the target primary base station to keep the source secondary base station as the secondary base station of the user equipment.

Therefore, in this embodiment, it may be implemented that a secondary base station remains unchanged in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the second configuration information may be obtained according to the first configuration information. For example, the receiving unit 1401 may receive the second configuration information that is obtained according to the first configuration information and sent by the source secondary base station, and add the second configuration information to a handover acknowledge message, and then, the handover acknowledge message is sent to the source primary base station. The second configuration information may include at least one of a cell identity of a secondary cell group of the source secondary base station, cell measurement information of a secondary cell group of the source secondary base station, bearer configuration information of a secondary cell group of the source secondary base station, or a configuration of a primary secondary cell of the source secondary base station.

In this embodiment of the present disclosure, the source secondary base station remains unchanged in a process of handover from a primary base station to another primary base station, that is, the target primary base station decides to add a same secondary base station, that is, the source secondary base station, for the user equipment in a process of handover from the source primary base station to the target primary base station. There may be two implementation manners.

A first implementation manner may be implemented using a secondary base station addition procedure, where the target primary base station sends a secondary base station addition request to the source secondary base station using the sending unit 1402, and instructs the source secondary base station to remain as the secondary base station of the user equipment.

For the first implementation manner, when the source primary base station receives the handover acknowledge message sent by the sending unit 1402, the source primary base station may trigger the source secondary base station to release a context, of the user equipment, allocated by the source primary base station to the source secondary base station and reserve a bearer.

A second implementation manner may be implemented using a secondary base station modification procedure, where the target primary base station sends a secondary base station modification request to the source secondary base station using the sending unit 1402, and instructs the source secondary base station to remain as the secondary base station of the user equipment.

For the second implementation manner, optionally, the sending unit 1402 sends, to the source secondary base station, a user equipment identity allocated by the source secondary base station, where the user equipment identity allocated by the source secondary base station is used by the source secondary base station to identify the user equipment, and is sent by the source primary base station to the target primary base station.

For the second implementation manner, optionally, the receiving unit 1401 receives transmission path information sent by the source secondary base station or the source primary base station, where the transmission path information is used by the target primary base station to complete switch of transmission paths between the source secondary base station and serving gateways.

For the second implementation manner, optionally, the sending unit 1402 sends a second indication to the source primary base station, where the second indication is used to instruct the source primary base station to keep the source secondary base station as the secondary base station of the user equipment.

The handover acknowledge message may include the second indication, and the second indication is used to instruct the source primary base station to keep the source secondary base station as the secondary base station of the user equipment. The source primary base station keeps the source secondary base station as the secondary base station of the user equipment according to the second indication.

For example, when the source primary base station receives the second indication, the source primary base station does not request the source secondary base station to release the context of the user equipment, or does not send data forwarding information to the source secondary base station, or notifies the source secondary base station that data on all bearers or some bearers does not need to be forwarded. The second indication may also be an implicit indication, for example, the source primary base station may parse the second configuration information, and determine whether the source secondary base station is to be released or continues to be reserved.

In this embodiment, the source secondary base station may send the second configuration information to the user equipment. If the user equipment keeps a bearer of an original secondary base station unchanged, the user equipment may neither reset a borne MAC entity nor re-establish a borne RLC entity, according to the second configuration information, and the user equipment reconfigures a borne PDCP entity according to a new security parameter (for example, a new SKeNB is derived according to a new KeNB, and then an encryption key for data transmission at the source secondary base station is derived). It may be understood that, when the bearer is not changed, DRB between the user equipment and the source secondary base station remains unchanged, and original configurations, that is, the MAC and/or the RLC, may be used.

Using the apparatus shown in FIG. 14, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Figure 15:
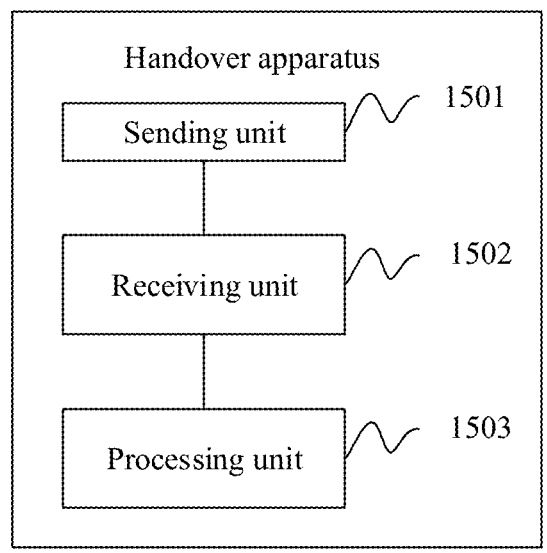
FIG. 15 is a schematic structural diagram of a handover apparatus according to an embodiment of the present disclosure.

Corresponding to Embodiment 1, as shown in FIG. 15, this embodiment of the present disclosure provides a handover apparatus, and the apparatus shown in FIG. 15 may be a source primary base station, or a source primary base station uses the apparatus shown in FIG. 15 to perform handover from a base station to another base station. The apparatus shown in FIG. 15 includes a sending unit 1501 configured to send a handover request to a target primary base station, where the handover request includes first configuration information of a source secondary base station, and the source primary base station and the source secondary base station jointly provide services for user equipment, and a receiving unit 1502 configured to receive a handover acknowledgement sent by the target primary base station, where the handover acknowledgement includes second configuration information of the source secondary base station, and the second configuration information is used to jointly provide services for the user equipment by the target primary base station and the source secondary base station.

The second configuration information of the source secondary base station is based on a first indication sent by the target primary base station to the source secondary base station, and the first indication is used to instruct the source secondary base station to remain unchanged.

In this embodiment of the present disclosure, for the first configuration information and the second configuration information, reference may be made to the foregoing description, and details are not further described herein.

In this embodiment of the present disclosure, the first indication is used to instruct the source secondary base station to remain as a secondary base station serving the user equipment, and instruct to change a primary base station serving the user equipment from the source primary base station to the target primary base station.

In this embodiment of the present disclosure, optionally, the sending unit 1501 is further configured to send, to the target primary base station, a user equipment identity allocated by the source secondary base station such that the target primary base station sends, to the source secondary base station, the user equipment identity allocated by the source secondary base station, where the user equipment identity allocated by the source secondary base station is used by the source secondary base station to identify the user equipment.

In this embodiment of the present disclosure, based on a scenario in which a secondary base station is modified, optionally, the sending unit 1501 is further configured to send transmission path information to the target primary base station, where the transmission path information is used by the target primary base station to complete switch of transmission paths between the source secondary base station and serving gateways.

In this embodiment of the present disclosure, optionally, the receiving unit 1502 is further configured to receive a second indication sent by the target primary base station, where the second indication is used to instruct the source primary base station to keep the source secondary base station as the secondary base station of the user equipment.

The apparatus shown in FIG. 15 further includes a processing unit 1503 configured to keep the source secondary base station as the secondary base station of the user equipment according to the second indication received by the receiving unit 1502.

In this embodiment of the present disclosure, based on a scenario in which a secondary base station is added, optionally, the processing unit 1503 is further configured to trigger, according to the handover acknowledgement received by the receiving unit 1502, the source secondary base station to release a bearer of the user equipment or a context of the user equipment.

In this embodiment of the present disclosure, optionally, the sending unit 1501 is further configured to send a third indication to the target primary base station, where the third indication is used to instruct the target primary base station to keep the source secondary base station as the secondary base station serving the user equipment.

Using the apparatus shown in FIG. 15, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Figure 16:
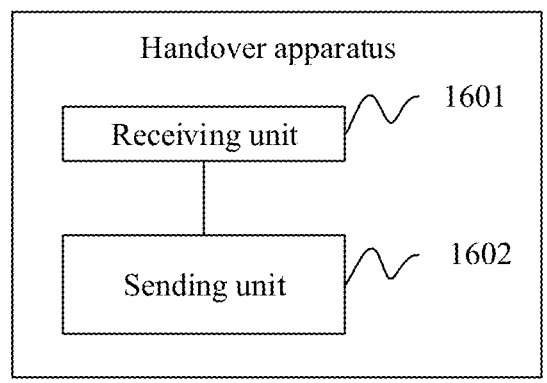
FIG. 16 is a schematic structural diagram of a handover apparatus according to an embodiment of the present disclosure.

Corresponding to Embodiment 1, as shown in FIG. 16, this embodiment of the present disclosure provides a handover apparatus, and the apparatus shown in FIG. 16 may be a source secondary base station, or a source secondary base station uses the apparatus shown in FIG. 16 to perform handover from a base station to another base station. The apparatus shown in FIG. 16 includes a receiving unit 1601 configured to receive a first indication sent by a target primary base station, where the first indication is used to instruct the source secondary base station to remain unchanged.

The first indication is based on a handover request that is sent by a source primary base station and that is received by the target primary base station, where the handover request includes first configuration information of the source secondary base station, and the source primary base station and the source secondary base station jointly provide services for user equipment, and the handover request is used by the target primary base station to send a handover acknowledgement to the source primary base station, where the handover acknowledgement includes second configuration information of the source secondary base station, and the second configuration information is used to jointly provide services for the user equipment by the target primary base station and the source secondary base station.

In this embodiment of the present disclosure, for the first configuration information and the second configuration information, reference may be made to the foregoing description, and details are not further described herein.

In this embodiment of the present disclosure, the first indication is used to instruct the source secondary base station to remain as a secondary base station serving the user equipment, and instruct to change a primary base station serving the user equipment from the source primary base station to the target primary base station.

In this embodiment of the present disclosure, optionally, the receiving unit 1601 is further configured to receive a user equipment identity that is allocated by the source secondary base station and sent by the target primary base station, where the user equipment identity allocated by the source secondary base station is used by the source secondary base station to identify the user equipment, and is sent by the source primary base station to the target primary base station.

In this embodiment of the present disclosure, based on a scenario in which a secondary base station is modified, optionally, the apparatus shown in FIG. 16 further includes a sending unit 1602 configured to send transmission path information to the target primary base station, where the transmission path information is used by the target primary base station to complete switch of transmission paths between the source secondary base station and serving gateways.

Using the apparatus shown in FIG. 16, it is implemented that a source secondary base station remains unchanged in a process in which a primary base station of user equipment changes from a source primary base station to a target primary base station. Because the source secondary base station is not released in the handover process, a delay problem caused because a source secondary base station is released in a handover process and the source secondary base station is re-added upon completion of the handover is avoided. In addition, an interruption problem of data communication between user equipment and the source secondary base station caused by release of the source secondary base station in the handover process is avoided.

Embodiment 6

Figure 17:
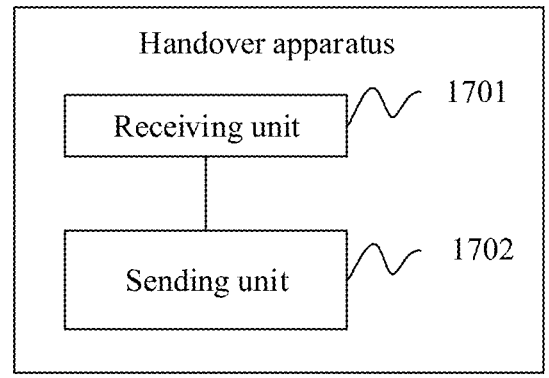
FIG. 17 is a schematic structural diagram of a handover apparatus according to an embodiment of the present disclosure.

Corresponding to Embodiment 2, as shown in FIG. 17, this embodiment of the present disclosure provides a handover apparatus, and the apparatus shown in FIG. 17 may be a target primary base station, or a target primary base station uses the apparatus shown in FIG. 17 to perform handover from a base station to another base station. The apparatus shown in FIG. 17 includes a receiving unit 1701 configured to receive a handover request sent by a source primary base station, where the handover request includes configuration information of a source secondary base station, and the source primary base station and the source secondary base station jointly provide services for user equipment, and a sending unit 1702 configured to send a first indication to a target secondary base station, where the first indication is used to instruct the target secondary base station to serve as a secondary base station of the user equipment, and send a handover acknowledgement to the source primary base station, where the handover acknowledgement includes configuration information of the target secondary base station, and the configuration information is used by the target primary base station and the target secondary base station to jointly provide services for the user equipment.

In this embodiment, the configuration information of the source secondary base station may be configuration information of a secondary cell group of the source secondary base station. For example, the configuration information of the source secondary base station may include at least one of a cell identity of the secondary cell group of the source secondary base station, cell measurement information of the secondary cell group of the source secondary base station, bearer configuration information of the secondary cell group of the source secondary base station, or a configuration of a primary secondary cell of the source secondary base station.

The cell measurement information may be a measurement result of RSRP, and the bearer configuration information may be a bearer type (for example, secondary cell group bearer, or a split bearer), or a QoS parameter of a bearer. The target primary base station may determine, according to the configuration information of the source secondary base station and/or local configuration information of the target primary base station, whether to change the secondary base station of the user equipment to the target secondary base station. For example, the local configuration information of the target primary base station may be at least one of the following: whether the target primary base station supports a dual connectivity feature, whether the target primary base station supports a function of keeping the source secondary base station unchanged, or a load status of the target primary base station.

In this embodiment, the first indication may be used to instruct the target secondary base station to serve as the secondary base station serving the user equipment, instruct to change a primary base station serving the user equipment from the source primary base station to the target primary base station, and instruct the target primary base station and the target secondary base station to jointly provide services for the user equipment.

For example, when determining that the target secondary base station is used as the secondary base station serving the user equipment, the sending unit 1702 sends a secondary base station addition request to the target secondary base station. The secondary base station addition request includes the first indication, where the first indication is used to instruct to add the target secondary base station as the secondary base station serving the user equipment. The first indication may also instruct to add, in a handover procedure or based on a handover procedure, the target secondary base station as the secondary base station serving the user equipment.

In this embodiment of the present disclosure, the receiving unit 1701 may receive a third indication sent by the source primary base station, where the third indication is used to instruct the target primary base station to add the target secondary base station as the secondary base station serving the user equipment.

Therefore, in this embodiment, it may be implemented that the target secondary base station is added as the secondary base station serving the user equipment in a process of handover from a primary base station to another primary base station, and it may be implemented that dual connectivity communication is implemented both before and after the handover. Further, that the target primary base station adds, after the handover is completed, the secondary base station used for the user equipment may be avoided, and a delay caused by the handover is reduced.

In this embodiment, the target primary base station obtains the configuration information of the target secondary base station. For example, a secondary base station addition acknowledgement that is sent by the target secondary base station and received by the receiving unit 1701 includes the configuration information of the target secondary base station, the configuration information of the target secondary base station is added to a handover acknowledge message, and the handover acknowledge message is sent to the source primary base station. The configuration information of the target secondary base station may include at least one of a cell identity of a secondary cell group of the target secondary base station, cell measurement information of a secondary cell group of the target secondary base station, bearer configuration information of a secondary cell group of the target secondary base station, or a configuration of a primary secondary cell of the target secondary base station.

In this embodiment of the present disclosure, the receiving unit 1701 receives first transmission path information sent by the target secondary base station, where the first transmission path information is allocated by the target secondary base station and is used for data transmission between the target secondary base station and a serving gateway. For example, the secondary base station addition acknowledgement that is sent by the target secondary base station and received by the receiving unit 1701 includes the first transmission path information (that is, an IP address and a GTP tunnel identifier). The first transmission path information is not limited to be included in the secondary base station addition acknowledgement.

In this embodiment of the present disclosure, the sending unit 1702 sends second transmission path information to the target secondary base station, where the second transmission path information is allocated by the serving gateway and is used for data transmission between the target secondary base station and the serving gateway. For example, after the receiving unit 1701 receives the first transmission path information sent by the target secondary base station, the sending unit 1702 adds the first transmission path information to a path switch request, and sends the path switch request to an MME. The receiving unit 1701 receives a path switch request completion message fed back by the MME, and the path switch request completion message includes the second transmission path information. The sending unit 1702 sends the second transmission path information to the target secondary base station such that the target secondary base station performs data transmission with the serving gateway using the second transmission path information. The second transmission path information may also be included in a dual connectivity dedicated message (for example, a bearer modification indication or a bearer modification completion message). A message used to bear the second transmission path information is not limited in this embodiment of the present disclosure.

In this embodiment of the present disclosure, the sending unit 1702 sends a second indication to the source primary base station, where the second indication is used to indicate that the target primary base station adds the target secondary base station as the secondary base station of the user equipment. The handover acknowledgement sent by the sending unit 1702 to the source primary base station includes the second indication, and the second indication may also instruct to add, in a handover procedure or based on a handover procedure, the target secondary base station as the secondary base station serving the user equipment. The source primary base station adds, according to the second indication, the target secondary base station as the secondary base station serving the user equipment.

For example, when the source primary base station receives the second indication, the source primary base station requests the source secondary base station to release a context of the user equipment, or sends data forwarding information to the source secondary base station, or notifies the source secondary base station that data on all bearers or some bearers needs to be forwarded. The second indication may also be an implicit indication, for example, the source primary base station may parse the configuration information of the target secondary base station, and determine to release the source secondary base station.

Using the apparatus shown in FIG. 17, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Figure 18:
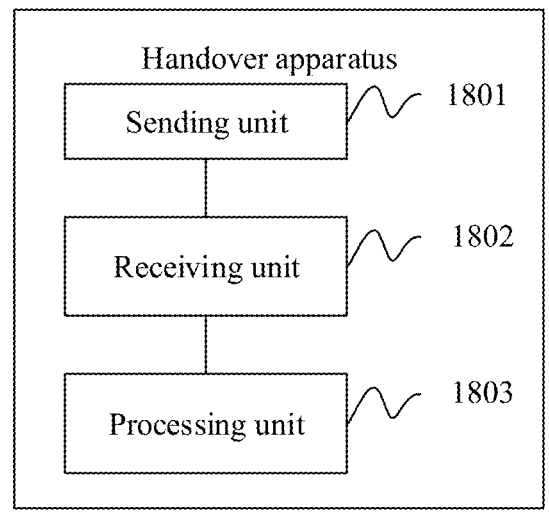
FIG. 18 is a schematic structural diagram of a handover apparatus according to an embodiment of the present disclosure.

Corresponding to Embodiment 2, as shown in FIG. 18, this embodiment of the present disclosure provides a handover apparatus, and the apparatus shown in FIG. 18 may be a source primary base station, or a source primary base station uses the apparatus shown in FIG. 18 to perform handover from a base station to another base station. The apparatus shown in FIG. 18 includes a sending unit 1801 configured to send a handover request to a target primary base station, where the handover request includes configuration information of a source secondary base station, and the source primary base station and the source secondary base station jointly provide services for user equipment, and a receiving unit 1802 configured to receive a handover acknowledgement sent by the target primary base station, where the handover acknowledgement includes configuration information of a target secondary base station, and the configuration information is used by the target primary base station and the target secondary base station to jointly provide services for the user equipment.

The handover acknowledgement is based on a first indication sent by the target primary base station to the target secondary base station, and the first indication is used to instruct the target secondary base station to serve as a secondary base station of the user equipment.

In this embodiment of the present disclosure, for the configuration information of the source secondary base station and the configuration information of the target secondary base station, reference may be made to the foregoing description, and details are not further described herein.

In this embodiment of the present disclosure, the receiving unit 1802 is further configured to receive a second indication sent by the target primary base station, where the second indication is used to indicate that the target primary base station adds the target secondary base station as the secondary base station of the user equipment.

In this embodiment of the present disclosure, the apparatus shown in FIG. 18 further includes a processing unit 1803 configured to release a bearer of the user equipment or a context of the user equipment according to the second indication received by the receiving unit 1802.

Using the apparatus shown in FIG. 18, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

Figure 19:
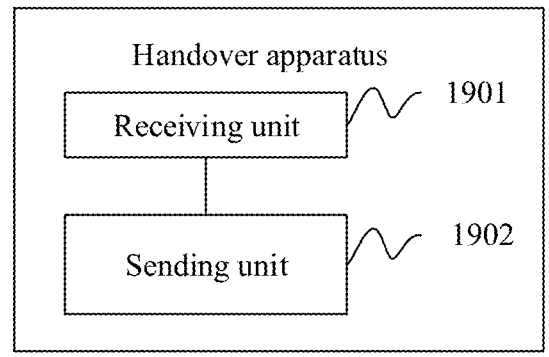
FIG. 19 is a schematic structural diagram of a handover apparatus according to an embodiment of the present disclosure.

Corresponding to Embodiment 2, as shown in FIG. 19, this embodiment of the present disclosure provides a handover apparatus, and the apparatus shown in FIG. 19 may be a target secondary base station, or a target secondary base station uses the apparatus shown in FIG. 19 to perform handover from a base station to another base station. The apparatus shown in FIG. 19 includes a receiving unit 1901 configured to receive first indication sent by a target primary base station, where the first indication is used to instruct the target secondary base station to serve as a secondary base station of user equipment.

The first indication is based on a handover request that is sent by a source primary base station and that is received by the target primary base station, where the handover request includes configuration information of a source secondary base station, and the source primary base station and the source secondary base station provide services for the user equipment together, and the handover request is used by the target primary base station to send a handover acknowledgement to the source primary base station, where the handover acknowledgement includes configuration information of the target secondary base station, and the configuration information is used by the target primary base station and the target secondary base station to jointly provide services for the user equipment.

In this embodiment of the present disclosure, for the configuration information of the source secondary base station and the configuration information of the target secondary base station, reference may be made to the foregoing description, and details are not further described herein.

In this embodiment of the present disclosure, the apparatus shown in FIG. 19 further includes a sending unit 1902 configured to send first transmission path information to the target primary base station, where the first transmission path information is allocated by the target secondary base station and is used for data transmission between the target secondary base station and a serving gateway.

The receiving unit 1901 is further configured to receive second transmission path information sent by the target primary base station, where the second transmission path information is allocated by the serving gateway and is used for data transmission between the target secondary base station and the serving gateway.

In this embodiment of the present disclosure, the first indication is used by the target primary base station to send a second indication to the source secondary base station, and the second indication is used to indicate that the target primary base station adds the target secondary base station as the secondary base station of the user equipment.

Using the apparatus shown in FIG. 19, it is implemented that a secondary base station of user equipment changes from a source secondary base station to a target secondary base station in a process in which a primary base station of the user equipment changes from a source primary base station to a target primary base station. Because the target secondary base station is added as the secondary base station of the user equipment in the handover process, dual-connectivity communication is implemented both before and after the handover, and a delay problem caused because a source secondary base station is released in a handover process and a target secondary base station is added upon completion of the handover is avoided. In addition, an interruption problem of data communication between user equipment and a secondary base station caused by release of the source secondary base station in the handover process is avoided.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method, comprising: sending, by a source primary base station, a handover request to a target primary base station, the handover request comprising a user equipment (UE) identity identifying the UE in a secondary base station; receiving, by the secondary base station from the target primary base station, an addition request for adding the secondary base station to the target primary base station, the addition request comprising the UE identity used to instruct the secondary base station to keep serving the UE; and receiving, by the source primary base station, a handover acknowledgement from the target primary base station.

2. The method of claim 1, wherein the UE identity is used to make the target primary base station determine whether to instruct the secondary base station to keep serving the UE.

3. The method of claim 1, wherein the UE identity is allocated by the secondary base station.

4. The method of claim 1, wherein the handover acknowledgement further comprises an indication to the source primary base station that the secondary base station keeps serving the UE.

5. The method of claim 1, further comprising:
not initiating, by the source primary base station, the secondary base station releasing a bearer of the UE.

6. The method of claim 1, wherein the handover request further comprises first configuration information of the secondary base station, or the handover acknowledge further comprises second configuration information of the secondary base station.

7. The method of claim 6, wherein the first configuration information or the second configuration information comprises at least one of:
a cell identity of a secondary cell group of the secondary base station;
a cell measurement information of the secondary cell group of the secondary base station;
a bearer configuration information of the secondary cell group of the secondary base station; or
a configuration of a primary secondary cell of the secondary base station.

8. A system comprising:
a source primary base station configured to:
send a handover request to a target primary base station, the handover request comprising a UE identity identifying a user equipment (UE) in a secondary base station;
the secondary base station configured to:
receive an addition request for adding the secondary base station to the target primary base station, the addition request comprising the UE identity used to instruct the secondary base station to keep serving the UE; and
the target primary base station configured to:
send a handover acknowledgement to the source primary base station.

9. The system of claim 8, wherein the handover acknowledgement further comprises an indication to the source primary base station that the secondary base station keeps serving the UE.

10. The system of claim 9, wherein the source primary base station is further configured not to initiate the secondary base station releasing a bearer of the UE.

11. The system of claim 8, wherein the handover request further comprises first configuration information of the secondary base station, or the handover acknowledge further comprises second configuration information of the secondary base station.

12. The system of claim 11, wherein the first configuration information or the second configuration information comprises at least one of the following: a cell identity of a secondary cell group of the secondary base station; a cell measurement information of a secondary cell group of the secondary base station; a bearer configuration information of a secondary cell group of the secondary base station; or a configuration of a primary secondary cell of the secondary base station.

13. The system of claim 8, wherein the UE identity is used to make the target primary base station determine whether to instruct the secondary base station to keep serving the UE.

14. The system of claim 8, wherein the UE identity is allocated by the secondary base station.

* * * * *

UNITED STATES PATENT AND TRADEMARK OFFICE
CERTIFICATE OF CORRECTION

PATENT NO. : 10,873,889 B2
APPLICATION NO. : 16/506195
DATED : December 22, 2020
INVENTOR(S) : Dai et al.

It is certified that error appears in the above-identified patent and that said Letters Patent is hereby corrected as shown below:

On the Title Page

Page 2 item (63), Column 1, "Related U.S. Application Data", Line 2: replace "PCT/CN2015/071515" with --PCT/CN2015/071575--
Page 2 item (56), Column 2, "Other Publications", Line 2: replace "getwork" with --Network--

In the Specification

Column 2, Line 28: replace "complete switch of" with --complete switching of--
Column 3, Line 56: replace "complete switch of" with --complete switching of--
Column 5, Line 28: replace "switch of" with --switching of--
Column 9, Line 59: replace "complete switch of" with --complete switching of--
Column 11, Line 26: replace "complete switch of" with --complete switching of--
Column 13, Line 1: replace "complete switch of" with --complete switching of--
Column 17, Line 45: replace "complete switch of" with --complete switching of--
Column 19, Line 7: replace "complete switch of" with --complete switching of--
Column 20, Line 51: replace "switch of" with --switching of--
Column 29, Line 39: replace "complete switch of" with --complete switching of--
Column 34, Line 20: replace "complete switch of" with --complete switching of--
Column 40, Line 36: replace "complete switch of" with --complete switching of--
Column 41, Line 37: replace "transceiver 902 configured" with --transceiver 902 is configured--
Column 42, Line 13: replace "complete switch of" with --complete switching of--
Column 43, Line 38: replace "complete switch of" with --complete switching of--
Column 45, Line 56: replace "switch request to an MIME." with --switch request to an MME.--
Column 50, Line 21: replace "switch of" with --switching of--
Column 51, Line 59: replace "complete switch of" with --complete switching of--
Column 52, Line 22: replace "station of user equipment" with --station of the user equipment--
Column 53, Line 16: replace "complete switch of" with --complete switching of--
Column 53, Line 21: replace "station of user equipment" with --station of the user equipment--

Signed and Sealed this
Fourth Day of October, 2022

Katherine Kelly Vidal
*Director of the United States Patent and Trademark Office*

CERTIFICATE OF CORRECTION (continued)
U.S. Pat. No. 10,873,889 B2

Column 56, Line 56: replace "station of user equipment" with --station of the user equipment--
Column 57, Line 12: replace "receive first indication sent" with --receive a first indication sent--
Column 57, Line 55: replace "station of user equipment" with --station of the user equipment--